United States Patent
Kamiya

(10) Patent No.: US 8,953,201 B2
(45) Date of Patent: Feb. 10, 2015

(54) IMAGE FORMING DEVICE, NON-TRANSITORY COMPUTER READABLE MEDIUM STORING PROGRAM, AND IMAGE FORMING METHOD FOR UPDATING SETTING INFORMATION

(75) Inventor: Satoshi Kamiya, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 67 days.

(21) Appl. No.: 13/461,294

(22) Filed: May 1, 2012

(65) Prior Publication Data
US 2013/0163035 A1   Jun. 27, 2013

(30) Foreign Application Priority Data
Dec. 26, 2011   (JP) .................................. 2011-284221

(51) Int. Cl.
*G06F 3/12* (2006.01)

(52) U.S. Cl.
USPC ........... 358/1.15; 358/1.13; 358/1.14; 399/83

(58) Field of Classification Search
CPC ..... G06F 3/1204; G06F 3/123; G06F 3/1222; G06F 3/1239; G06F 3/1255; G06F 3/1285; H04N 1/00408; H04N 1/00925; H04N 2201/0039; H04N 2201/0094; H04N 1/00204; H04N 1/00482; H04N 1/00514; H04N 1/00917; H04N 1/00973; H04N 1/4413; H04N 2201/0075
USPC .......................... 358/1.13, 1.14, 1.15; 399/83
See application file for complete search history.

(56) References Cited

U.S. PATENT DOCUMENTS

| | | | |
|---|---|---|---|
| 2006/0023254 A1 | 2/2006 | Hikichi | |
| 2006/0051149 A1 | 3/2006 | Sawano | |
| 2008/0085133 A1* | 4/2008 | Ishii | 399/83 |
| 2009/0040546 A1* | 2/2009 | Hirakawa | 358/1.14 |
| 2010/0259783 A1* | 10/2010 | Matsuzawa | 358/1.15 |
| 2012/0081732 A1* | 4/2012 | Sugaya | 358/1.13 |
| 2012/0194844 A1* | 8/2012 | Natori | 358/1.15 |

FOREIGN PATENT DOCUMENTS

| | | |
|---|---|---|
| JP | A-2006-40061 | 2/2006 |
| JP | A-2006-79353 | 3/2006 |

* cited by examiner

*Primary Examiner* — Benny Q Tieu
*Assistant Examiner* — Juan M Guillermety
(74) *Attorney, Agent, or Firm* — Oliff PLC

(57) ABSTRACT

Provided is an image forming device including a modifying unit that individually modifies plural items of setting information held in an own device, a specifying unit that specifies an item of the setting information which is not modified by the modifying unit, a communication unit that communicates with an external device, an acquiring unit that acquires reference setting information corresponding to each of the plural items of the setting information from the external device via the communication unit, and an updating unit that updates the item of the setting information specified by the specifying unit based on the reference setting information acquired by the acquiring unit.

16 Claims, 17 Drawing Sheets

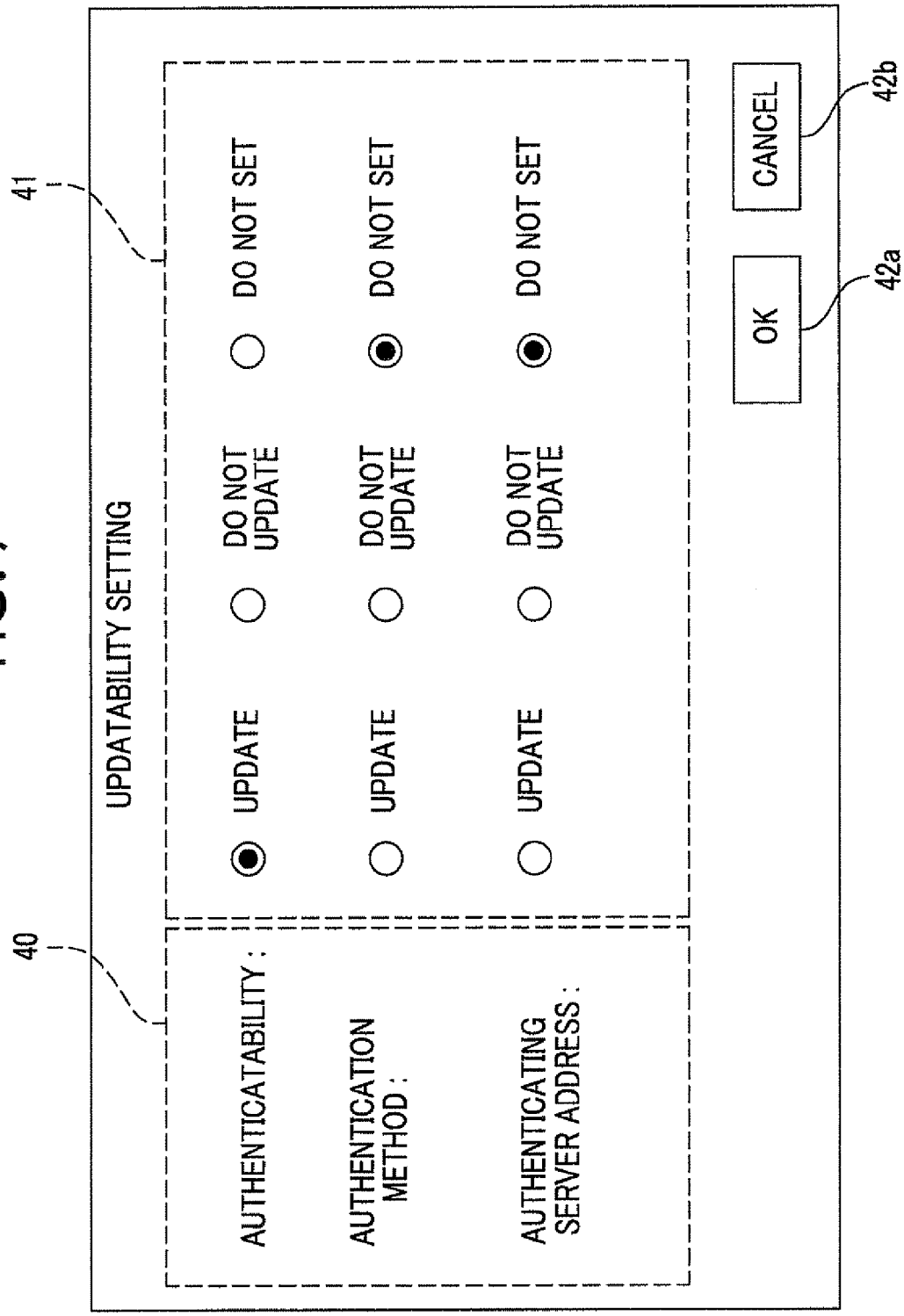

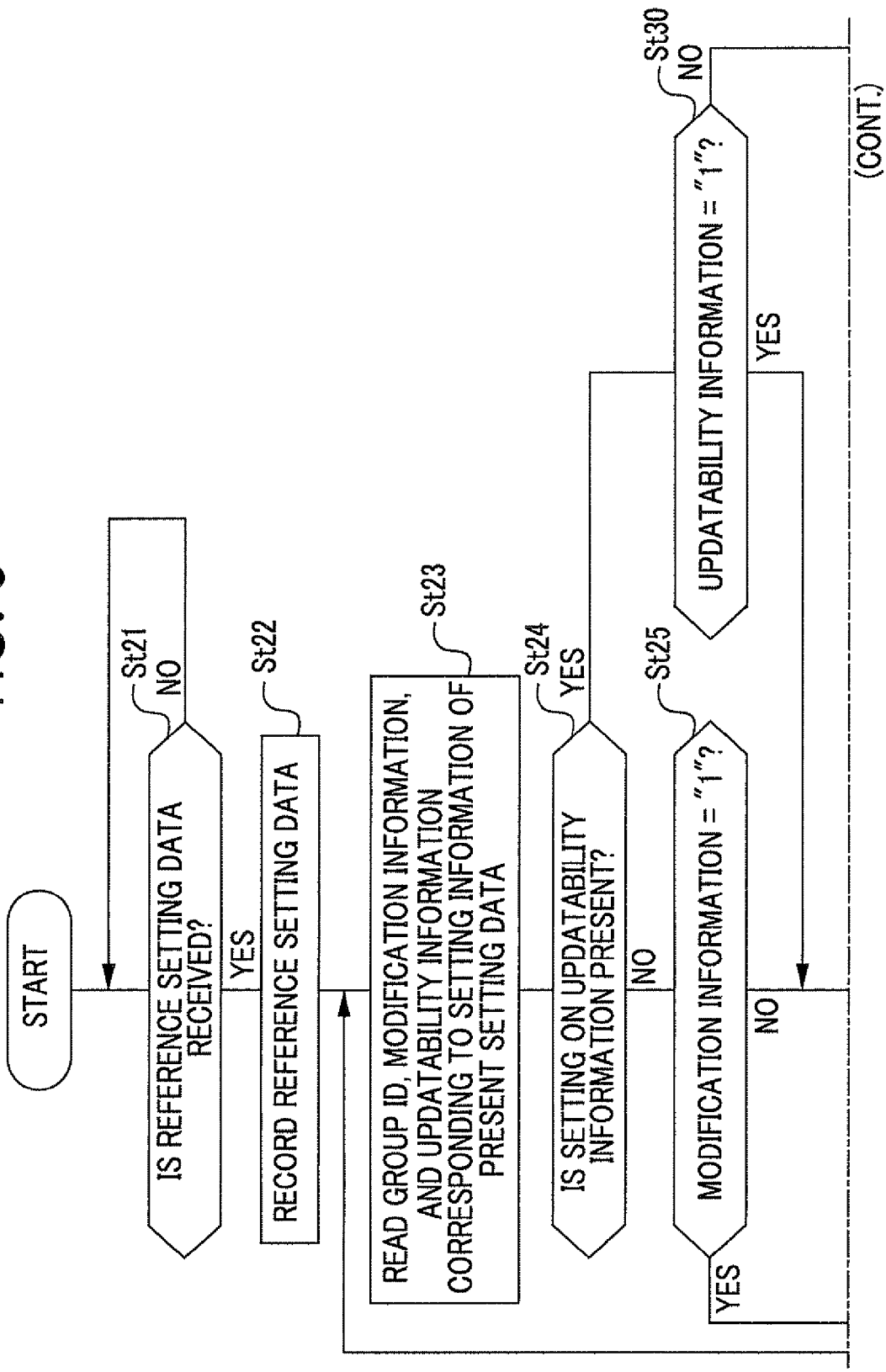

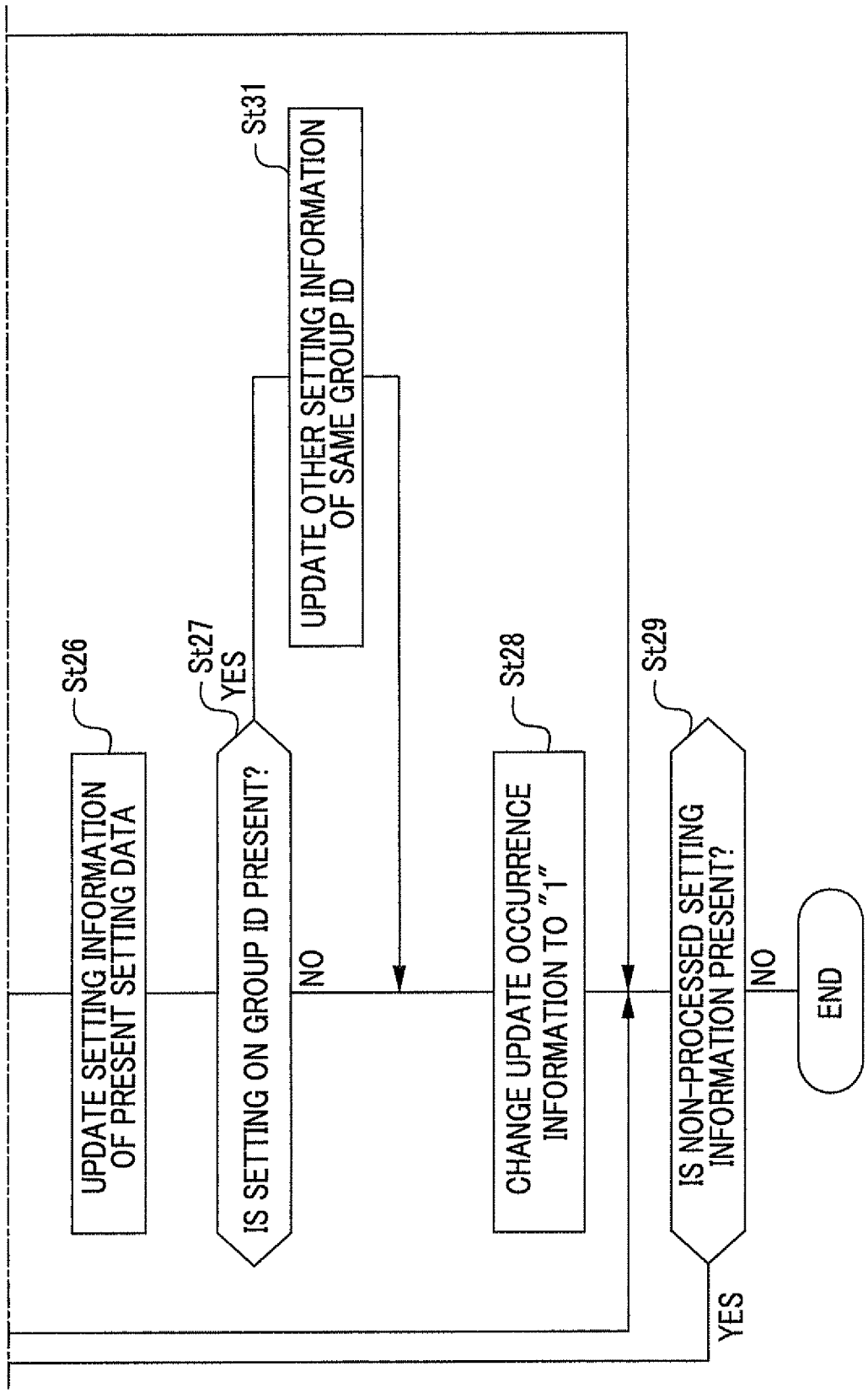

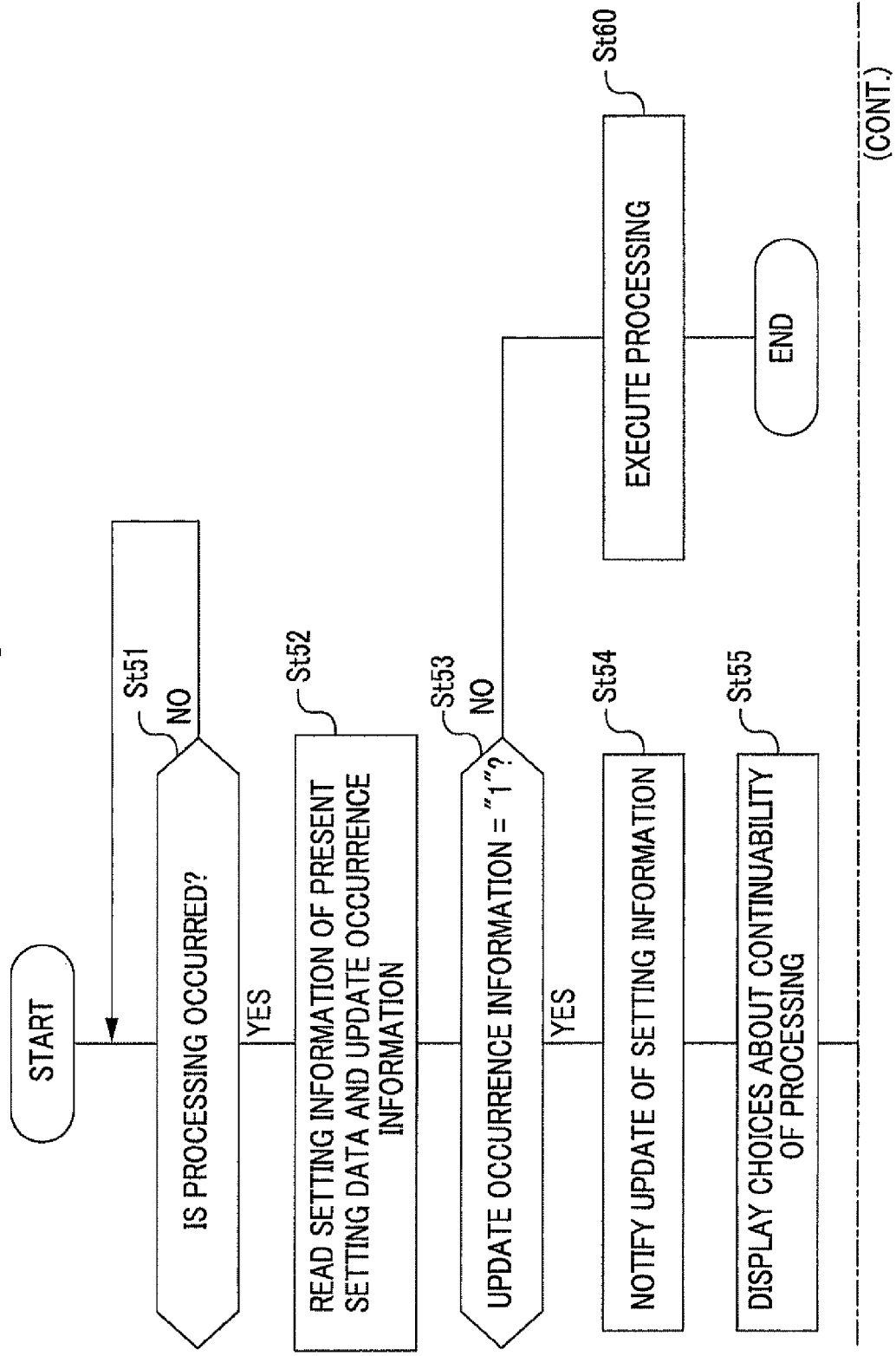

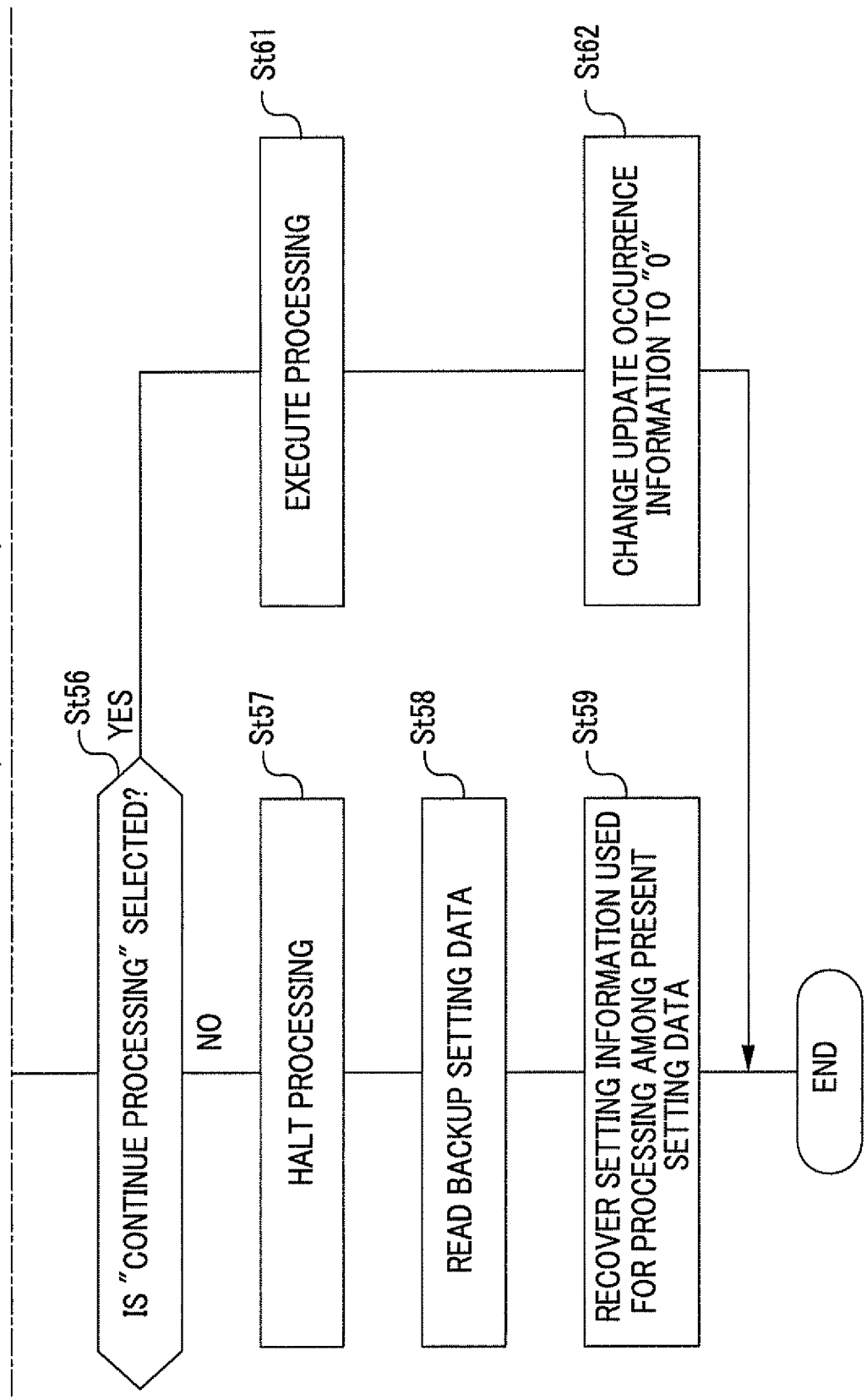

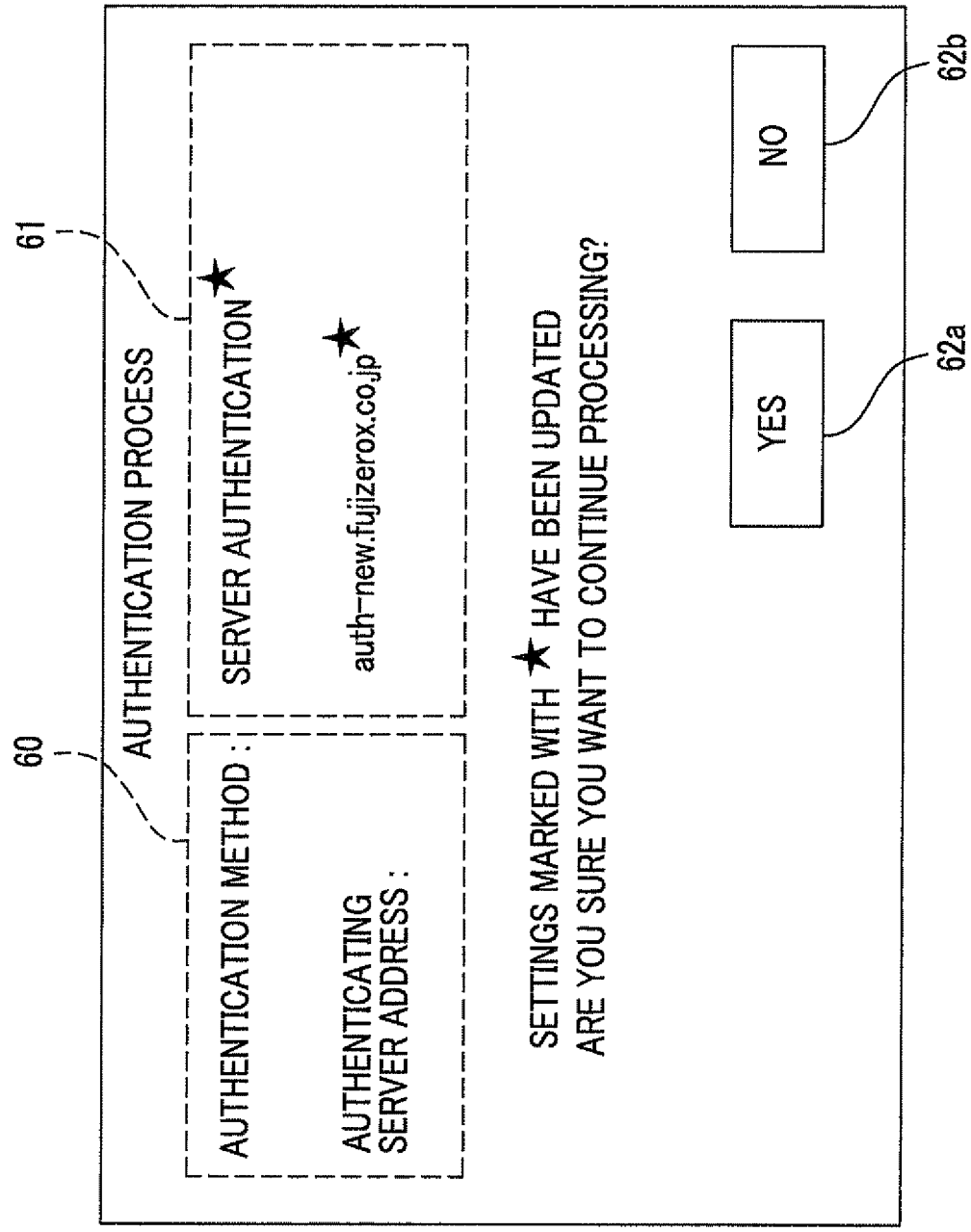

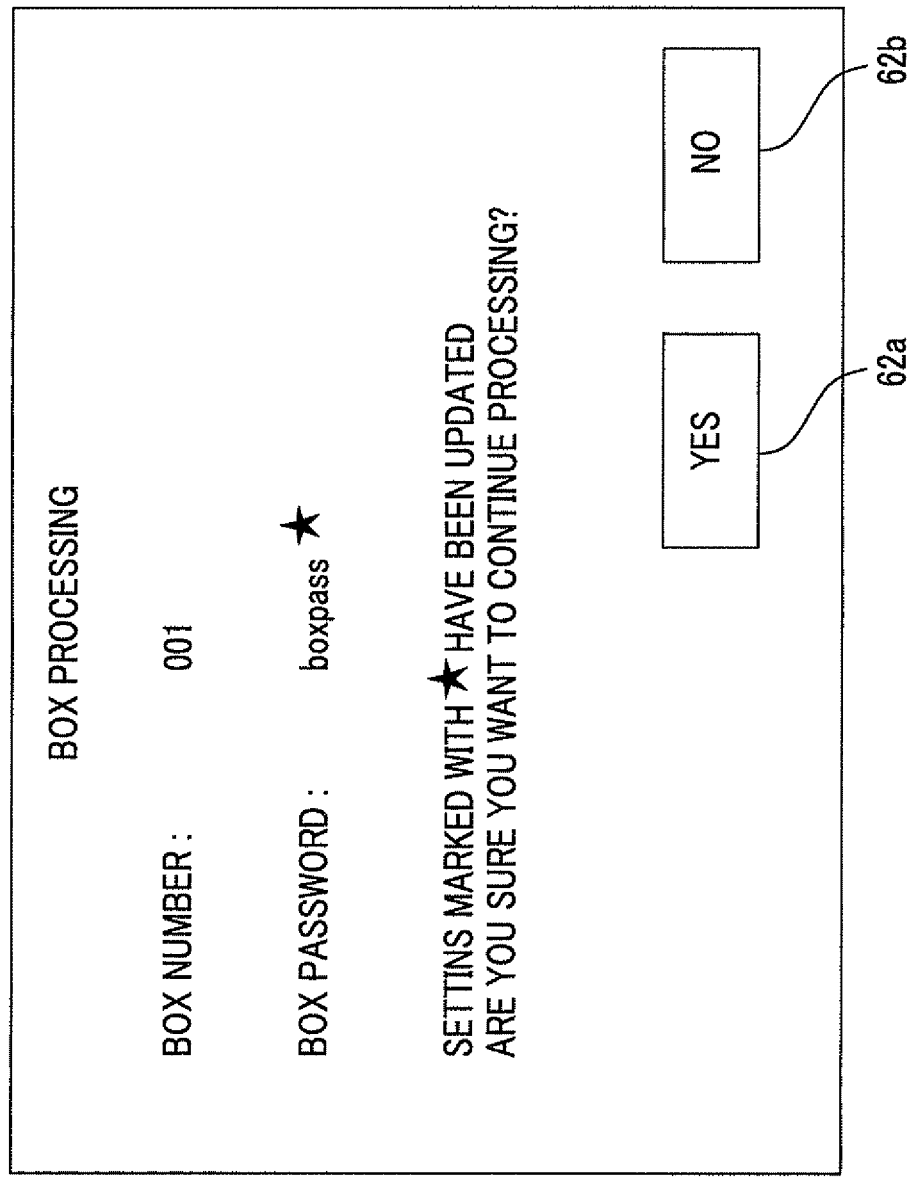

FIG. 14A

REFERENCE SETTING DATA

| DATA IDENTIFICATION INFORMATION = FOR UPDATE | REFERENCE SETTING INFORMATION (1) | REFERENCE SETTING INFORMATION (2) | REFERENCE SETTING INFORMATION (3) | ...... | REFERENCE SETTING INFORMATION (N) |
|---|---|---|---|---|---|

FIG. 14B

INDIVIDUAL MODIFICATION DATA

| DATA IDENTIFICATION INFORMATION = FOR INDIVIDUAL | SETTING INFORMATION (1) | SETTING INFORMATION (3) | SETTING INFORMATION (5) |
|---|---|---|---|

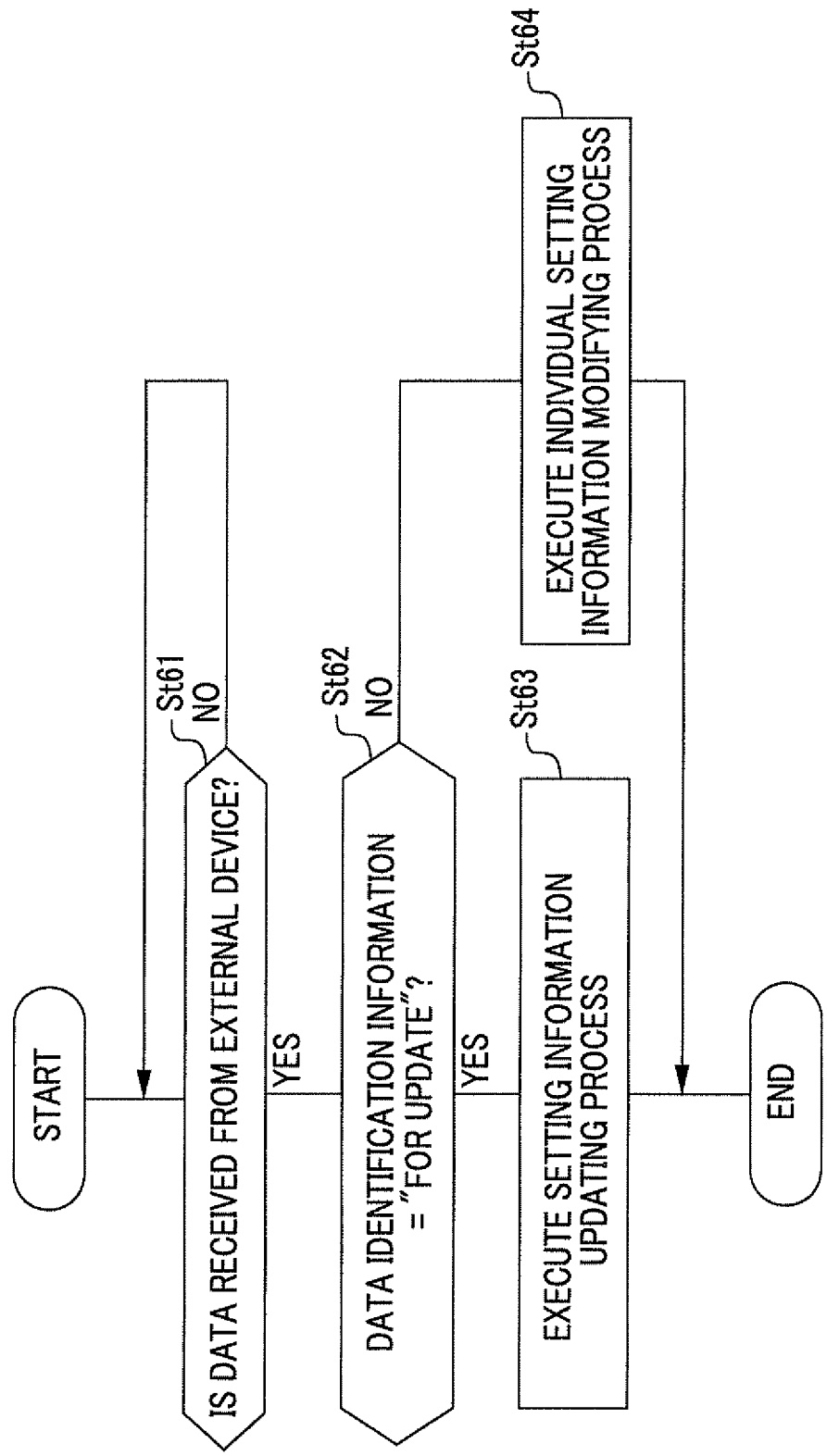

US 8,953,201 B2

IMAGE FORMING DEVICE, NON-TRANSITORY COMPUTER READABLE MEDIUM STORING PROGRAM, AND IMAGE FORMING METHOD FOR UPDATING SETTING INFORMATION

CROSS-REFERENCE TO RELATED APPLICATIONS

This application is based on and claims priority under 35 USC 119 from Japanese Patent Application No. 2011-284221 filed Dec. 26, 2011.

BACKGROUND (i) Technical Field

The present invention relates to an image forming device, a non-transitory computer readable medium storing a program, and an image forming method.

(ii) Related Art

Multiple image forming devices used by the same users have substantially the same usage form and thus have the same settings. When installing a new image forming device or relocating an installed image forming device, a technique of transmitting the setting information of a specific image forming device to one or more other image forming devices via a communication network such as a local area network (LAN) and updating the setting information of the image forming devices in order to effectively perform the setting process. This technique is referred to as cloning.

SUMMARY

According to an aspect of the present invention, there is provided an image forming device including: a modifying unit that individually modifies plural items of setting information held in an own device; a specifying unit that specifies an item of the setting information which is not modified by the modifying unit; a communication unit that communicates with an external device; an acquiring unit that acquires reference setting information corresponding to each of the plural items of the setting information from the external device via the communication unit; and an updating unit that updates the item of the setting information specified by the specifying unit based on the reference setting information acquired by the acquiring unit.

BRIEF DESCRIPTION OF THE DRAWINGS

Exemplary embodiments of the present invention will be described in detail based on the following figures, wherein:

FIG. 7 shows an example of a display screen in which updatability setting is performed;

FIG. 8 is a flowchart showing the process of an update controller;

FIG. 11 is a flowchart showing the process of an operation controller;

FIG. 12 shows an example of a setting update notification screen;

FIG. 13 shows another example of a setting update notification screen;

FIGS. 14A and 14B show configuration examples of data received from an external device; and FIG. 15 is a flowchart of a process of determining the type of data received from an external device.

DETAILED DESCRIPTION

Figure 1:
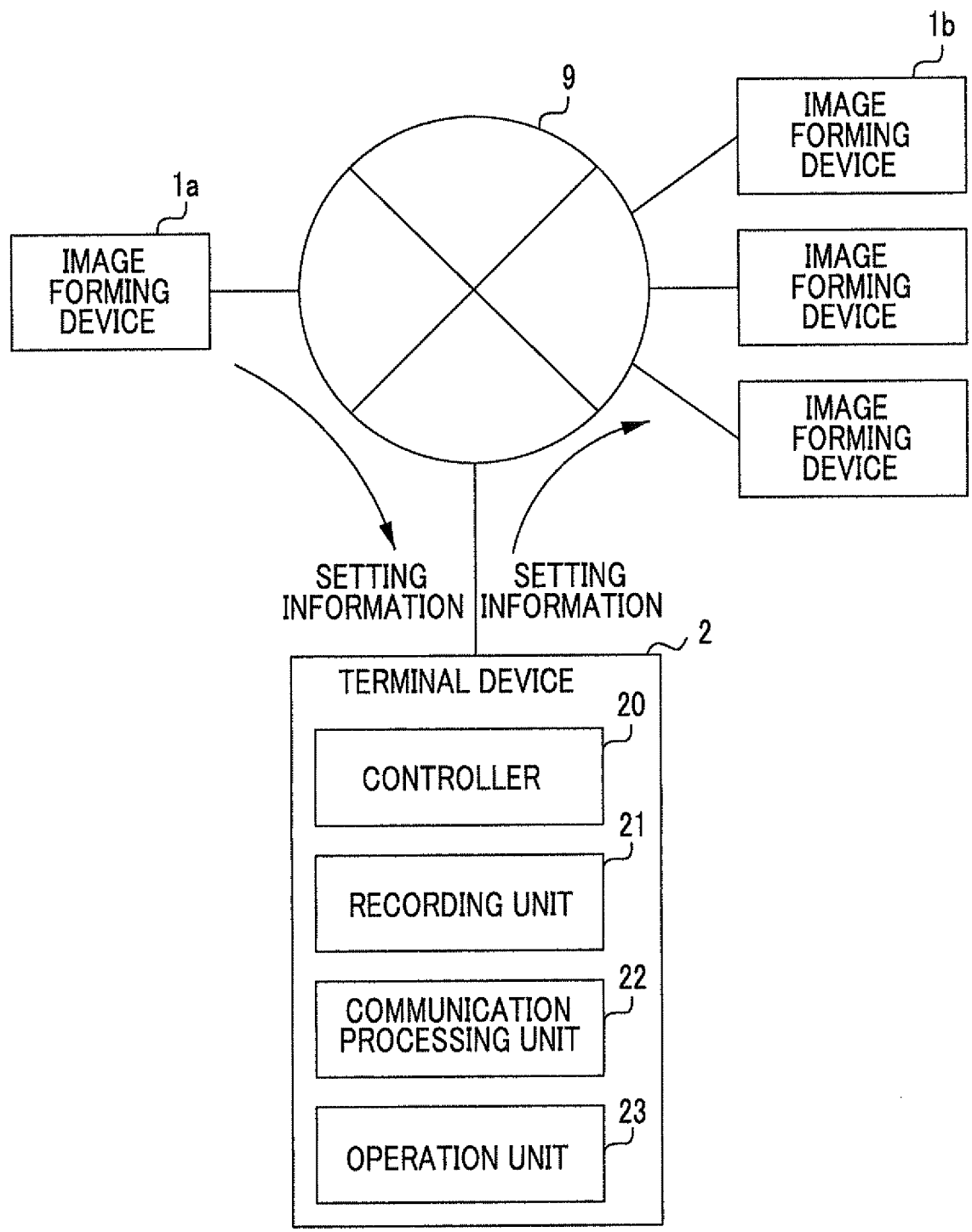
FIG. 1 is a configuration diagram of a communication network.

As shown in FIG. 1, in this exemplary embodiment, image forming devices 1a and 1b and a terminal device 2 are connected to each other via a communication network such as a LAN 9. The connection may be realized by a wired or wireless connection.

The image forming devices 1a and 1b are devices that provide users with a copying function, a print function, a scan function, and a facsimile function. In this exemplary embodiment, the setting information of multiple other image forming devices 1b which are newly installed or relocated from other locations are updated for example, based on the setting information of the image forming device 1a which has already been used in an office. Here, setting information means information used for various processes of the image forming devices 1a and 1b. Moreover, updating of the setting information means modifying the contents of the setting information of multiple image forming devices 1b to the same content as the content of the setting information of the specific image forming device 1a or to the content corresponding to the content of the setting information of the image forming device 1a.

A setting information updating process is performed in accordance with an operation from the terminal device 2 such as a personal computer. The terminal device 2 is an information processing terminal having a communication function and is configured to receive setting information from one image forming device 1a and transmit the setting information to multiple other image forming devices 1b. The transmission may be performed sequentially on one device selected from the multiple image forming devices 1b and may be performed simultaneously on multiple devices among the multiple image forming devices 1b.

The terminal device 2 includes a controller 20, a recording unit 21, a communication processing unit 22, and an operating unit 23. The controller 20 is an arithmetic processing circuit such as a central processing unit (CPU) and controls the entire processing of the terminal device 2.

The recording unit 21 is an information recording device such as a random access memory (RAM) or a hard disk drive. The communication processing unit 22 processes communication via the LAN 9. The operating unit 23 is a user's operating unit such as a keyboard or a mouse.

The controller 20 sends a request for transmission of setting information to the image forming device 1a upon receiving a command to update the settings of the image forming device 1b via the operating unit 23. In response to the request, the image forming device 1a transmits the setting information of the own device to the terminal device 2 via the LAN 9. The controller 20 records the setting information received by the communication processing unit 22 in the recording unit 21.

Moreover, the controller 20 transmits the setting information recorded in the recording unit 21 to multiple image forming devices 1b which are updating targets via the communication processing unit 22. The method of transmitting and receiving the setting information is not limited to this, and the setting information may be transmitted directly from the image forming device 1a to multiple other image forming devices 1b via the LAN 9. In addition, the setting information of the image forming device 1a may be recorded in a portable recording medium such as a memory card without using the LAN 9, and the recording medium may be connected to the multiple image forming devices 1b so that the setting information is written to the image forming devices 1b.

As described above, the image forming device 1a is a device that provides reference setting information, and the multiple image forming devices 1b are targets to be updated based on the setting information. The image forming device 1a and each of the multiple image forming devices 1b may have different or the same functions, and in the following description, the image forming device 1b which serves as an updating target will be described.

Figure 2:
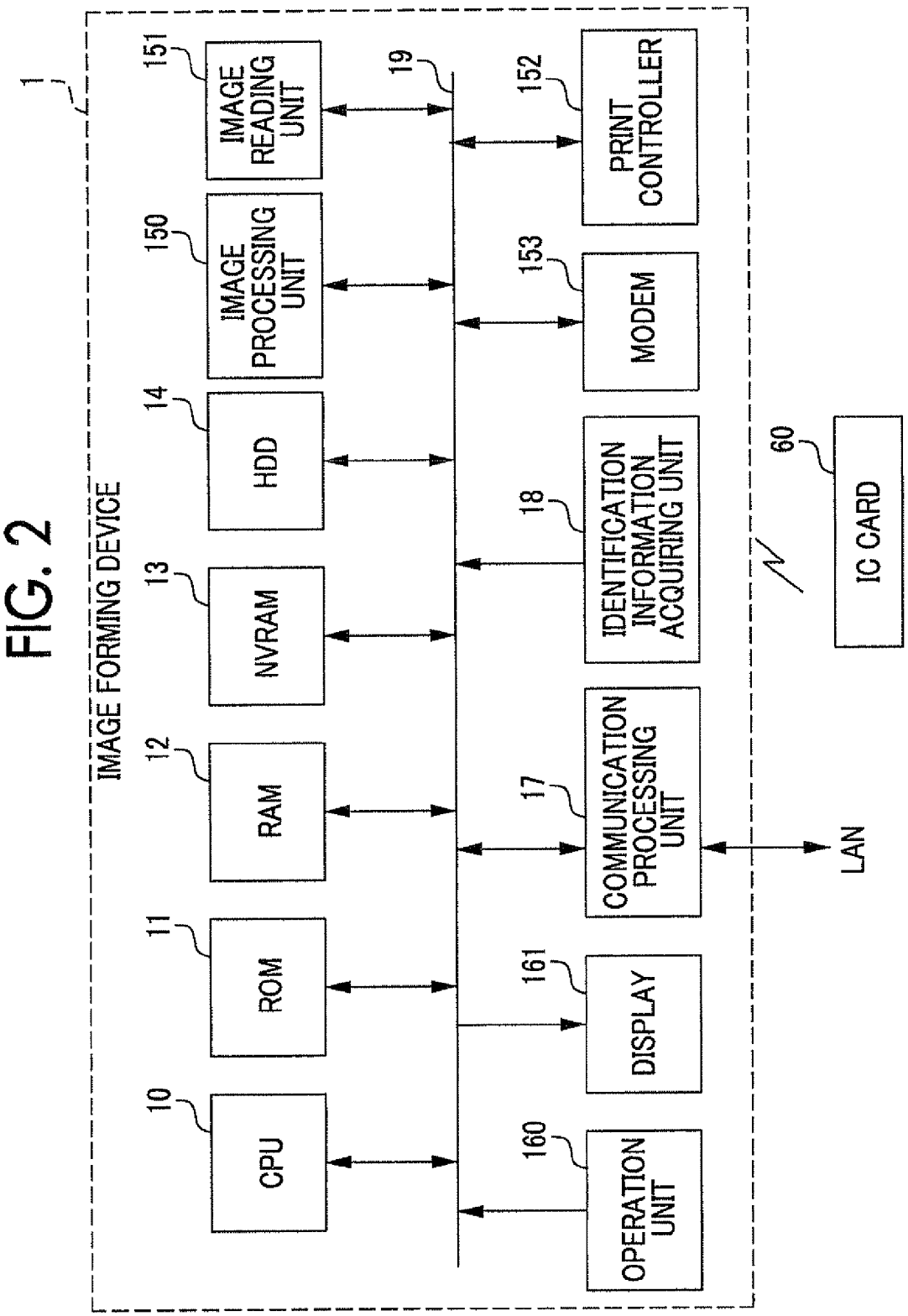
FIG. 2 is a mechanism configuration diagram of an image forming device.

As shown in FIG. 2, the image forming device 1 includes a central processing unit (CPU) 10, a read only memory (ROM) 11, a random access memory (RAM) 12, a non-volatile RAM (NVRAM) 13, an operating unit 160, a display 161, and a communication processing unit 17.

The CPU 10 is an arithmetic processing circuit that performs entire control of the image forming device 1 and controls the setting information updating process described above in addition to execution of a copying function, a print function, a scan function, and a facsimile function.

A program for operating the CPU 10 is recorded in the ROM 11. The RAM 12 is a working memory for allowing the CPU 10 to operate with this program. Although the image forming device 1 of this exemplary embodiment is configured such that the functions are implemented by software, the functions may be implemented by hardware including an application specific integrated circuit. The NVRAM 13 is a flash memory, for example, and a management table including an identification information for identifying a user is recorded in the NVRAM 13.

The operating unit 160 is an operation unit for allowing the user of the device 1 to perform various operations and includes a touch panel, a hard key, and the like. The display 161 is a liquid crystal panel, for example, and is used in a state of being superimposed on the touch panel. The display 161 is used as a unit that notifies the user of various types of information and a unit that displays an input screen using the touch panel.

The communication processing unit 17 is a communication unit that performs communication with an external device and is configured by a circuit connected to the LAN 9 so as to process communication with other devices. Transmission and reception of the setting data are performed by the communication processing unit 17.

Moreover, the image forming device 1 includes an identification information acquiring unit 18, a hard disk drive (HDD) 14, an image processing unit 150, an image reading unit 151, a modem 153, and a print processing unit 152.

The identification information acquiring unit 18 functions as an identification information input unit that inputs identification information for identifying a user together with the operating unit 160 described above. The identification information acquiring unit 18 is configured as an IC card reader that reads an identification number from an IC card 60 of a user by near field communication (NFC), for example. The identification information acquiring unit 18 is connected to the main body of the image forming device 1 via a universal serial bus (USB) interface or the like.

An identification number which is a unique number allocated to each user may be used as the identification information, for example. The identification information is not limited to the identification number but may be a character string including characters such as the alphabet.

When using the image forming device 1, the user swipes the IC card 60 through the identification information acquiring unit 18 so that the identification number is recognized by the device 1 or inputs the identification number directly from the operating unit 160. The identification number is used for an authentication process depending on the content of the setting information. The identification information acquiring unit 18 may be configured by other device as long as it acquires identification information.

The HDD 14 is a storage unit that stores various kinds of setting data including the setting information. Moreover, the HDD 14 also stores image data or the like when executing a print function or the like.

The image processing unit 150 performs decompression, compression, and the like on the image data when executing a print function or the like. The image reading unit 151 reads the image data when executing a copying function or the like. The modem 153 is connected to a telephone line so as to perform facsimile communication when executing a facsimile function. The print processing unit 152 performs printing of the image data or the like when executing a print function.

The above-described respective units 10 to 14, 17, 18, 150 to 153, 160, and 161 are electrically connected to each other via a bus 19.

Next, the function of the CPU 10 and setting data recorded in the HDD 14 will be described with reference to FIG. 3. Upon reading the program recorded in the ROM 11, the CPU 10 implements the functions of an individual modification controller 100, a setting information acquiring unit 101, a presence-of-modification specifying unit 108, an updatability setting unit 102, an update controller 103, a backup controller 104, a recovery controller 105, an initialization controller 106, and an operation controller 107. These functions are executed in accordance with the operation of a user via the operating unit 160.

On the other hand, fixed data 140, initial setting data 141, present setting data 142, backup setting data 143, and reference setting data 144 are recorded on the HDD 14. The data 140 to 144 may be recorded in a recording unit such as the NVRAM 13. Before describing the functions of the respective units 100 to 107 of the CPU 10, the data 140 to 144 will be described.

TABLE 1

| Item | Content |
|---|---|
| Model Name | SuperFX |
| Serial Number | 6288 |
| Image Adjustment Data | 0.11 |

The fixed data 140 includes information unique to a device as shown in Table 1. For example, "Model Name" is the product name of the device 1, and "Serial Number" is the manufacturer's number of the device 1. Moreover, "Image Adjustment Data" is a numerical value used for processing of correcting a variation in the ink density or the like of each device 1. Table 1 is just an example of the fixed data 140.

Since the fixed data 140 includes information unique to a device, the fixed data 140 may not be modified by the user. Thus, the fixed data 140 is not a target of the updating process described above. The fixed data 140 may be transmitted to the image forming device 1b in the updating process in FIG. 1, for example, in order to determine whether the image forming device 1a and the updating target image forming device 1b have the same product type.

Moreover, the initial setting data 141, the present setting data 142, and the backup setting data 143 include multiple setting information and information corresponding to the individual setting information and are used for different purposes. The initial setting data 141 is setting data of the state when manufacturing the device 1, that is, of the initial state, and is used for initializing the settings by the initialization controller 106.

The present setting data 142 is used for various processes. The operation controller 107 performs various processes in accordance with the setting information of the present setting data 142. The backup setting data 143 is reserved setting data backed up by the backup controller 104. The backup setting data 143 may include a single file and may include multiple files generated for each date when backup processing is performed.

TABLE 2

| Item | Setting Information | Group ID | Modification | Updatability | Update Occurrence |
|---|---|---|---|---|---|
| IP Address Acquisition Method | DHCP | 1 | 0 | — | 0 |
| IP Address | — | 1 | 0 | — | 0 |
| Authenticatability | Do not Authenticate | 2 | 0 | — | 0 |
| Authentication Method | Server | 2 | 0 | — | 0 |
| Authenticating Server Address | — | 2 | 0 | — | 0 |
| Mail Server Address | — | — | 0 | — | 0 |
| Box Password | — | — | 0 | — | 0 |
| Destination List | — | — | 0 | — | 0 |
| Volume | Medium | — | 0 | — | 0 |
| Power-Saving Waiting Time | — | — | 0 | — | 0 |
| Administrator Password | — | — | 0 | — | 0 |

Specifically, the initial setting data 141, the present setting data 142, and the backup setting data 143 each include multiple setting information corresponding respectively to multiple items, and a group ID, modification information, updatability information, and update occurrence information correlated with individual setting information as shown in Table 2. The contents of respective information in the table and the numerical values thereof illustrate the contents of the state when manufacturing the device 1, that is, of the initial setting data 141. Moreover, the symbol "-" in the table represents a non-set state where no setting information is present.

First, the contents of the respective items will be described. "IP Address Acquisition Method" represents a method of determining the Internet protocol (IP) address of the device 1 in the LAN 9 and is selected from "Fixed" where an address designated in advance is used, "DHCP" where a dynamic host configuration protocol (DHCP) is used, and "BOOTP" where a bootstrap protocol (BOOTP) is used. Moreover, "IP Address" is an IP address used when "IP Address Acquisition Method" is "Fixed."

"Authenticatability" represents whether a user authentication process is performed or not. "Authentication Method" designates a device that performs an authentication process and is selected from "Main Body" where the image forming device 1 performs the authentication process and "Server" where an external authenticating server performs the authentication process. "Authenticating server address" is a uniform resource locator (URL) address of the authenticating server used when "Authentication Method" is "Server."

The authentication process is performed based on the user identification information described above. When "Authentication Method" is set to "Main Body," the CPU 10 refers to a management table recorded in the NVRAM 13 so as to compare identification information in the management table with the input identification information to thereby perform an authentication process. On the other hand, when "Authentication Method" is set to "Authenticating Server," the CPU 10 transmits the input identification information to an authenticating server designated by "Authenticating Server Address" via the communication processing unit 17 to thereby acquire an authentication result.

"Mail Server Address" is a URL address of a mail server used when the device 1 sends and receives an email. "Box Password" is a password used for viewing the content of a box. The box is a folder in which an image file obtained by a scan function, for example, is stored, the security of which is improved with a password.

"Destination List" is a file name in which a list of facsimile numbers and email addresses is recorded. "Volume" is a volume level of a sound effect generated when a user operates the operating unit 160. "Power-Saving Waiting Time" is a waiting time until some power is turned off when the device 1 is not used. "Administrator Password" is a password used when an administrator user logs into the device 1 in order to perform the setting information updating process described above or modify individual settings.

Next, information associated with the setting information of the respective items will be described. The group ID is identification information of a group to which setting information belongs. In the table, a group ID of "1" is allocated to "IP Address Acquisition Method" and "IP Address" which are related to network settings. On the other hand, a group ID of "2" is allocated to "Authenticatability," "Authentication Method," and "Authenticating Server Address" which are related to authentication settings. Since the group ID is information that depends on the content of an item, the group ID may not be changed by the user.

The modification information represents whether each of the multiple setting information is modified by the individual modification controller 100. The individual modification controller 100 functions as a modifying unit that individually modifies the setting information selected from the multiple setting information held in the image forming device 1.

The modification by the individual modification controller 100 is not the updating process described with reference to FIG. 1 but is a process in which the user directly designates setting information and modifies the content thereof using the operating unit 160 as described later. The updating process is a process in which the update controller 103 modifies the present setting data 142 based on the reference setting data 144 acquired from the terminal device 2.

Thus, the modification information represents whether the corresponding setting information is modified from the content of the initial setting data 141 or the content of the reference setting data 144. Therefore, when the modification information is "0," it means that the content of the setting information is in the initial state or is the same as the content of the reference setting data 144. When the modification information is "1," it means that the individual modification controller 100 has modified the content of the setting information from the initial state or from the content of the reference setting data 144.

The updatability information represents whether the corresponding setting information may be updated or not. The updatability setting unit 102 assigns the updatability information to only the setting information designated from the user. In the initial state, the updatability information is not assigned to all of the setting information. That is, in the initial state, the updatability information is in a non-set state ("-" in the table) with respect to all of the setting information.

The update occurrence information represents whether or not the updating process described with reference to FIG. 1 has been performed on the corresponding setting information. That is, the update occurrence information represents whether or not the corresponding setting information has been updated by the update controller 103. When the update occurrence information is "0," it means that the corresponding setting information is not updated. When the update occurrence information is "1," it means that the corresponding setting information is updated. In the initial state, the update occurrence information is set to "0" with respect to all of the setting information. After the update occurrence information of setting information is changed to "1," when the updated setting information is used by the operation controller 107, the update occurrence information is changed to "0."

TABLE 3

| Item | Setting Information |
|---|---|
| IP Address Acquisition Method | BOOTP |
| IP Address | — |
| Authenticatability | Authenticate |
| Authentication Method | Server |
| Authenticating Server Address | auth2.fx.co.jp |
| Mail Server Address | mail2.fx.co.jp |
| Box Password | boxpass2 |
| Destination List | list2 |
| Volume | Medium |
| Power-Saving Waiting Time | 10 Minutes |
| Administrator Password | mgpass2 |

The reference setting data 144 is used when the update controller 103 updates the present setting data 142, and includes reference setting information corresponding to each of the multiple setting information as shown in Table 3. The reference setting data 144 is first acquired from the specific image forming device 1a by the terminal device 2 in the updating process described with reference to FIG. 1 and is then acquired from the terminal device 2 by the setting information acquiring unit 101 of the image forming device 1b. The content in the table is just an example.

Next, the functions of the CPU 10 shown in FIG. 3 will be described. The individual modification controller 100 functions as a modifying unit that individually modifies setting information selected from the multiple setting information held in the device 1. Specifically, the individual modification controller 100 modifies setting information selected from the multiple setting information included in the present setting data 142 to the content designated by the user based on the operation of the user input via the operating unit 160. Moreover, the individual modification controller 100 updates the modification information (see Table 2) of the setting information modified by the individual modification controller 100 among the multiple setting information to a state representing "modified."

Figure 4:
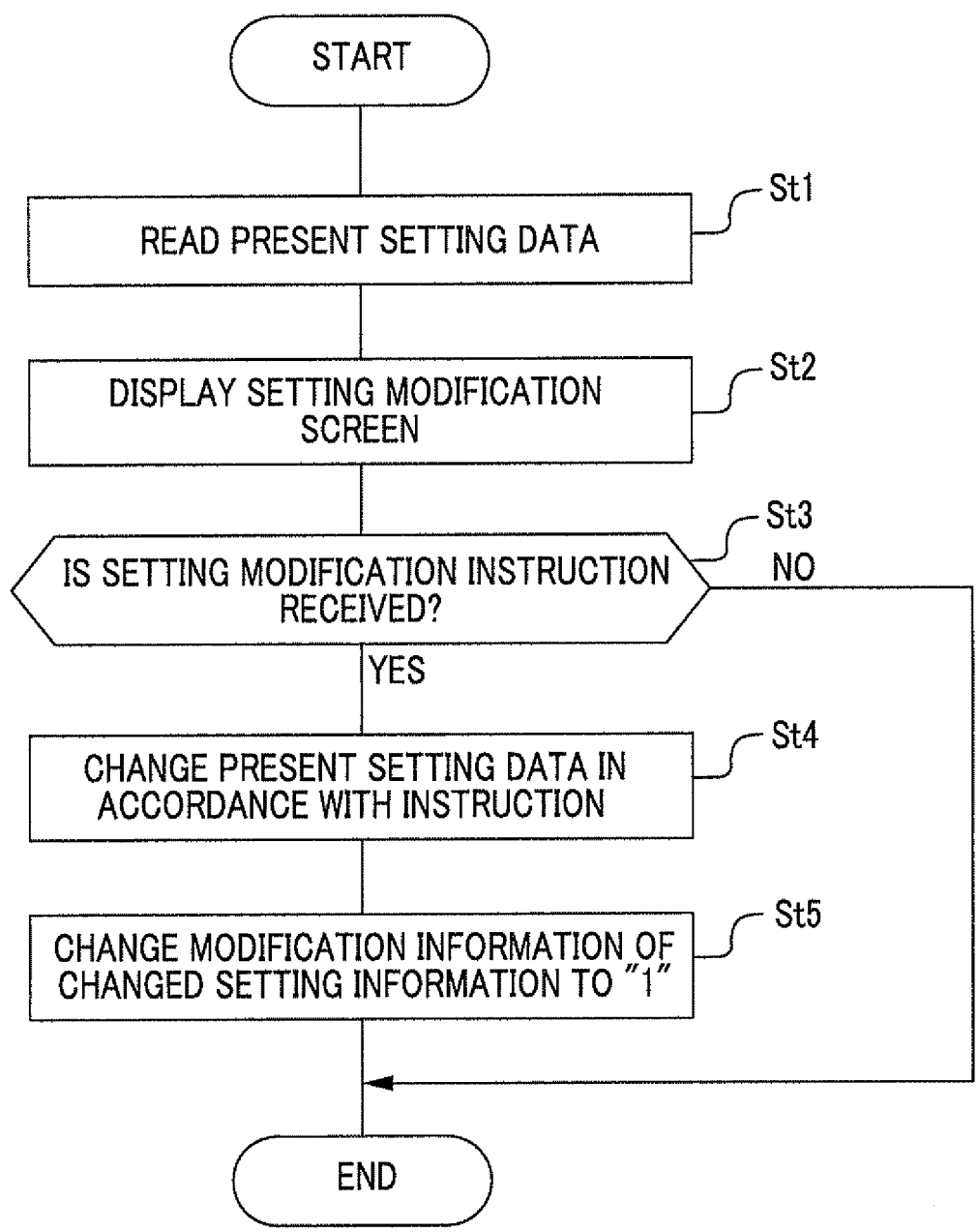
FIG. 4 is a flowchart showing the process of an individual modification controller.

FIG. 4 shows the process of the individual modification controller 100. The individual modification controller 100 reads the present setting data 142 (step St1) and then displays a setting modification screen on the display 161 (step St2).

Figure 5:
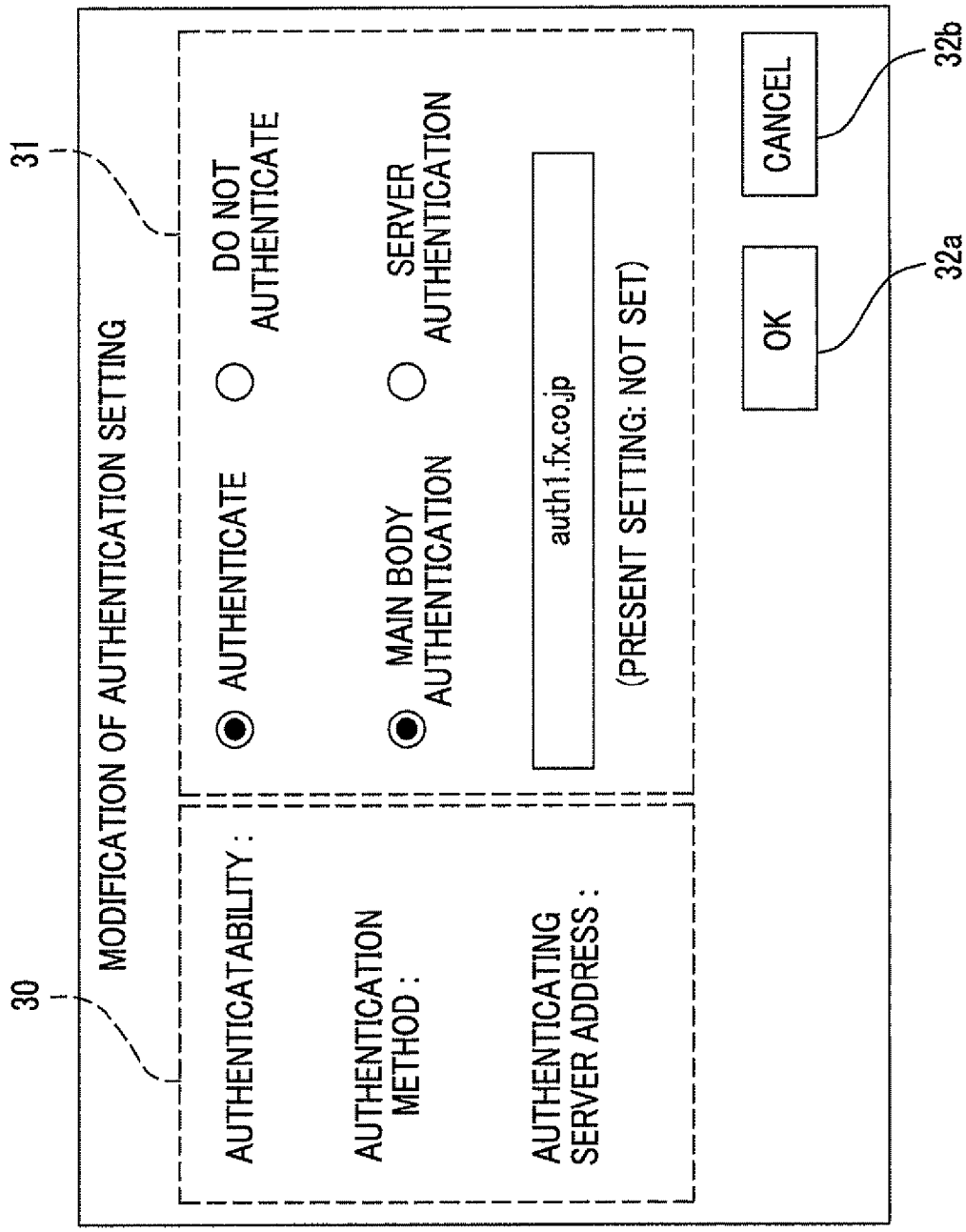
FIG. 5 shows an example of a display screen in which individual modification is performed.

FIG. 5 shows an example of the setting modification screen. In the screen, a region 30 in which at least one item name is displayed, a region 31 in which setting information corresponding to each item is displayed and input, an OK button 32a, and a Cancel button 32b are included. For example, the user selects a modification target item and modifies individual settings using the touch panel which is the operating unit 160. When the OK button 32a is pressed, the modified settings are finalized. When the Cancel button 32b is pressed, the modified settings edited in the screen are canceled.

Referring to FIG. 4, when the OK button 32a is pressed in the setting modification screen so that a setting modification instruction is input (step St3: YES), the individual modification controller 100 modifies the content of setting information selected on the setting modification screen among the setting information of the present setting data 142 in accordance with the instruction (step St4).

Moreover, the individual modification controller 100 modifies the modification information corresponding to the modified setting information to "1" (Modified) (step St5). On the other hand, the individual modification controller 100 ends processing when the Cancel button 32b is pressed (step St3: NO).

As above, when the corresponding setting information is modified by the individual modification controller 100, the modification information is modified to "1" (Modified). When the corresponding setting information is updated by the update controller 103, the modification information is not modified. Thus, when the setting information is updated to the reference setting information from the content of the initial settings by the individual modification controller 100, and is updated to another reference setting information from the reference setting information, the corresponding modification information maintains the state of "0" (Not Modified).

Figure 3:
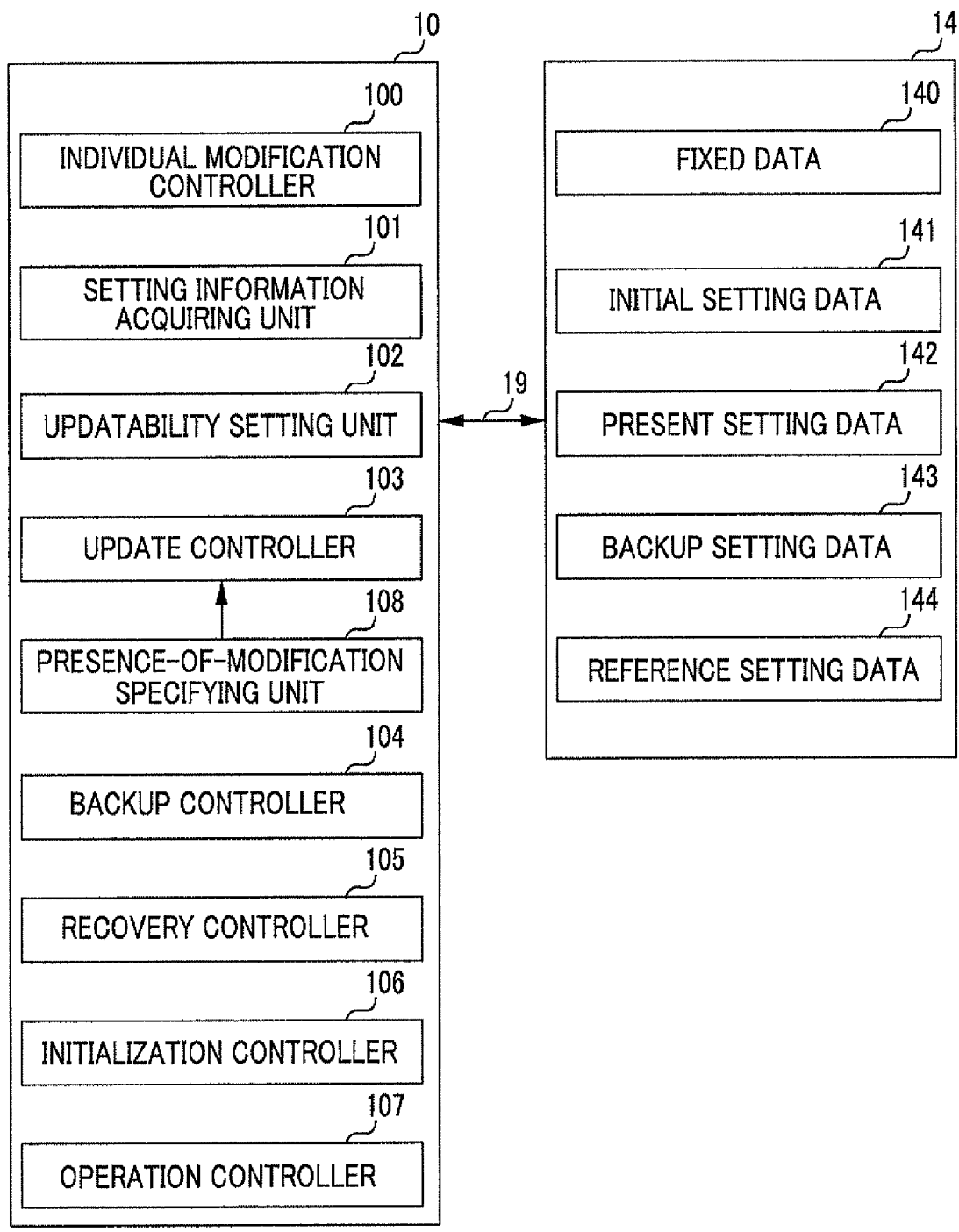
FIG. 3 is a configuration diagram of functions implemented in a CPU.

Moreover, the setting information acquiring unit 101 in FIG. 3 functions as an acquiring unit that acquires reference setting information from an external device via the communication processing unit 17. In the exemplary embodiment shown in FIG. 1, the setting information acquiring unit 101 acquires setting information from the terminal device 2. As described above, the setting information acquiring unit 101 may acquire the setting information directly from the specific image forming device 1a and may acquire the setting information from a recording medium connected to the device 1.

The updatability setting unit 102 functions as an assigning unit that assigns updatability information representing the updatability by the update controller 103 to the setting information selected from the multiple setting information of the present setting data 142 in accordance with the operation of the user input via the operating unit 160.

Figure 6:
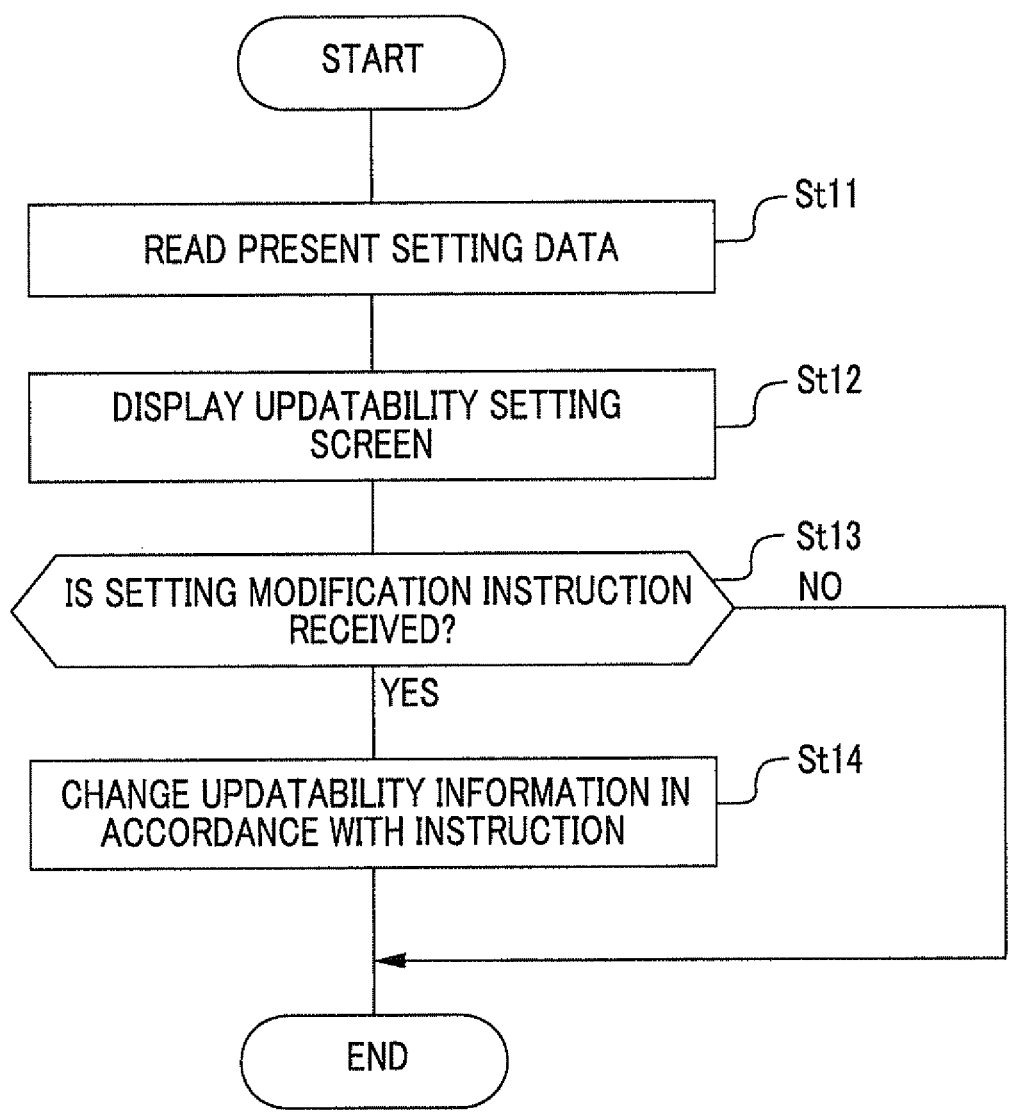
FIG. 6 is a flowchart showing the process of an updatability setting unit.

FIG. 6 shows the process of the updatability setting unit 102. The updatability setting unit 102 reads the present setting data 142 (step St11), and then displays an updatability setting screen on the display 161 (step St12).

FIG. 7 shows an example of the updatability setting screen. In the screen, a region 40 in which at least one item name is displayed, a region 41 in which updatability information corresponding to each item is input, an OK button 42a, and a Cancel button 42b are included. For example, the user selects a setting target item using the touch panel which is the operating unit 160 to individually set the updatability ("Update" or "Do not update"). When the user does not want to set the updatability information, the user selects "Do not set." When the OK button 42*a* is pressed, the modified settings are finalized. When the Cancel button 42*b* is pressed, the modified settings edited in the screen are canceled.

Referring to FIG. 6, when the OK button 42*a* is pressed in the updatability setting screen so that a setting modification instruction is input (step St13: YES), the updatability setting unit 102 modifies the content of the updatability information of the setting information among the setting information on the present setting data 142 in accordance with the instruction (step St14). That is, in the updatability setting screen, when "Update" is set, the updatability information in Table 2 is set to "1." When "Do not update" is set, the updatability information is set to "0." When "Do not set" is set, the updatability information is set to "-". On the other hand, the updatability setting unit 102 ends processing when the Cancel button 42*b* is pressed (step St13: NO).

Moreover, the presence-of-modification specifying unit 108 in FIG. 3 functions as a specifying unit that specifies setting information which is not modified by the individual modification controller 100 among the multiple setting information included in the present setting data 142. Specifically, the presence-of-modification specifying unit 108 specifies the setting information which is not modified by the individual modification controller 100 based on the modification information.

The update controller 103 functions as an updating unit that updates the setting information specified by the presence-of-modification specifying unit 108 among the multiple setting information included in the present setting data 142 based on the reference setting information (see Table 3) of the reference setting data 144 acquired by the setting information acquiring unit 101. Moreover, the update controller 103 identifies a group to which the setting information belongs in accordance with a group ID and updates all of the setting information included in the group when at least one setting information included in the group is specified by the presence-of-modification specifying unit 108 as one which is not modified by the individual modification controller 100, or when at least one setting information included in the group is determined to be updatable based on the updatability information.

The update controller 103 determines whether an item is an updating target or not sequentially one by one with respect to all of the items of the present setting data 142 and performs updating when the item is determined to be an updating target. Hereinafter, the updating process of the update controller 103 will be described in detail.

FIG. 8 shows the process of the update controller 103. Upon receiving the reference setting data 144 from the terminal device 2 in FIG. 1 or the like (step St21: YES), the update controller 103 records the reference setting data 144 in a recording medium such as the HDD 14 (step St22). Moreover, the update controller 103 reads the group ID, modification information, and updatability information corresponding to one item of the present setting data 142 from the HDD 14 (step St23).

The update controller 103 determines whether the setting on the updatability information is present for the item (step St24). When there is no setting on the updatability information, that is, the group ID in Table 2 is "-" (step St24: NO), the update controller 103 causes the presence-of-modification specifying unit 108 to specify whether the setting information of the item is modified by the individual modification controller 100 (step St25). When the modification information is "1" (Modified), (step St25: YES), the presence-of-modification specifying unit 108 determines that the user has modified the individual settings. In this case, the update controller 103 does not update the setting information. Moreover, when there is a non-processed item in the present setting data 142 (step St29: YES), the flow returns to step St23. When there is not a non-processed item (step St29: NO), the processing ends.

On the other hand, when the modification information is "0" (Not Modified) (step St25: NO), the presence-of-modification specifying unit 108 determines that the user has not modified the individual settings. In this case, the update controller 103 updates the setting information based on the corresponding reference setting information among the recorded reference setting data 144 (step St26). In this way, it is determined whether the setting information of an item to which the updatability information and a group ID are not set is an updating target or not based on only the modification information.

Subsequently, the update controller 103 determines whether the setting on the group ID is present for the setting information (step St27). When the setting on the group ID is not present, that is, when the group ID in Table 2 is "-" (step St24: NO), the update controller 103 modifies the update occurrence information of the item to "1" (Updated) (step St28). Moreover, when there is a non-processed item in the present setting data 142 (step St29: YES), the flow returns to step St23. When there is not a non-processed item, the processing ends (step St29: NO).

On the other hand, when the setting on the group ID is present, that is, when the group ID in Table 2 is "1" or "2" (step St27: YES), the update controller 103 retrieves other items having the same group ID from the present setting data 142 and updates the setting information based on the corresponding reference setting information among the recorded reference setting data 144 (step St31). Moreover, the update controller 103 modifies the update occurrence information corresponding to the updated setting information to "1" (Updated) (step St28).

As above, when anyone of the setting information having the same group ID is determined to be an updating target, the setting information of an item to which a group ID is set is updated regardless of the contents of the modification information and the updatability information. That is, the setting information of items to which a group ID is set is updated in respective groups.

Moreover, the update controller 103 updates setting information to which updatability information is assigned by the updatability setting unit 102 among the multiple setting information when the setting information is determined to be updatable ("1") based on the updatability information. The update controller 103 does not update the setting information when the setting information is determined to be not updatable ("0"). That is, when the setting on the updatability information is present (step St24: YES), and the updatability information is "1" (step St30: YES), the update controller 103 performs the processes of step St26 and the subsequent step. When the updatability information is "0" (step St30: NO), the update controller 103 performs the process of step St29.

As above, when a group ID is set to the setting information in which the updatability information is set, it is determined whether the setting information is an updating target regardless of the content of the modification information.

Hereinafter, a specific example of updating by the update controller 103 will be described.

TABLE 4

| Item | Setting Information | Group ID | Modification | Updatability | Update Occurrence | Determination |
|---|---|---|---|---|---|---|
| IP Address Acquisition Method | Fixed | 1 | 1 | — | 0 | ○ |
| IP Address | — | 1 | 0 | — | 0 | ○ |
| Authenticatability | Authenticate | 2 | 1 | — | 0 | X |
| Authentication Method | Main Body | 2 | 1 | — | 0 | X |
| Authenticating Server Address | auth1.fx.co.jp | 2 | 1 | — | 0 | X |
| Mail Server Address | mail1.fx.co.jp | — | 1 | — | 0 | X |
| Box Password | boxpass1 | — | 1 | — | 0 | X |
| Destination List | — | — | 0 | — | 0 | ○ |
| Volume | Medium | — | 0 | — | 0 | ○ |
| Power-Saving Waiting Time | — | — | 0 | — | 0 | ○ |
| Administrator Password | mgpass1 | — | 1 | — | 0 | X |

Table 4 shows an example of the present setting data 142, in which the modification information of "IP Address Acquisition Method," "Authenticatability," "Authentication Method," "Authenticating Server Address," "Mail Server Address," "Box Password," and "Administrator Password" is "1" (Modified), and there is no setting on the updatability information. In Table 4, the "Determination" column represents the result of the determination by the update controller 103. A setting item marked with "O" is an updating target, and a setting item marked with "X" is not an updating target.

As described above, it is determined whether the setting information of an item to which the updatability information and a group ID are not set is an updating target or not based on only the modification information. Thus, since the modification information of "Mail Server Address," "Box Password," and "Administrator Password" is "1," the setting items are determined not to be updating targets ("X"). Therefore, the setting information which is individually set by the user in accordance with the usage environment of the device 1 is not updated.

Moreover, when any one of the setting information having the same group ID is determined to be an updating target, the setting information of an item to which a group ID is set is updated regardless of the contents of the modification information and the updatability information. However, as for "Authenticatability," "Authentication Method," and "Authenticating Server Address" having the same group ID ("2"), since the modification information of all of the setting items in the same group is "1," all of the setting items are determined not to be an updating target ("X"). Thus, multiple setting information associated with each other are not updated when all of them are modified by the user.

On the other hand, "IP Address Acquisition Method" is determined to be an updating target ("O") since the modification information of "IP Address" having the same group ID ("1") is "0" (Not Modified). Thus, multiple setting information associated with each other are updated when only part of them is modified by the user. In this way, it is possible to prevent setting information in the same group from being inconsistent.

For example, in the above table, "IP Address Acquisition Method" is "Fixed," whereas "IP Address" that is, to be designated to "Fixed" is in a non-set state ("-"). That is, the settings contents of "IP Address Acquisition Method" and "IP Address" are not consistent. However, as described above, since "IP Address Acquisition Method" and "IP Address" are determined to be an updating target, the two setting items are collectively updated to correct settings contents.

TABLE 5

| Item | Setting Information | Group ID | Modification | Updatability | Update Occurrence |
|---|---|---|---|---|---|
| IP Address Acquisition Method | BOOTP | 1 | 1 | — | 1 |
| IP Address | — | 1 | 0 | — | 1 |
| Authenticatability | Authenticate | 2 | 1 | — | 0 |
| Authentication Method | Server | 2 | 1 | — | 0 |
| Authenticating Server Address | auth2.fx.co.jp | 2 | 1 | — | 0 |
| Mail Server Address | mail2.fx.co.jp | — | 1 | — | 0 |
| Box Password | boxpass1 | — | 1 | — | 0 |
| Destination List | list2 | — | 0 | — | 1 |
| Volume | Medium | — | 0 | — | 1 |
| Power-Saving Waiting Time | 10 Minutes | — | 0 | — | 1 |
| Administrator Password | mgpass1 | — | 1 | — | 0 |

Table 5 illustrates an example of present setting data when the setting information illustrated in Table 4 are updated based on the reference setting information illustrated in Table 3. As understood from Table 5, "IP Address Acquisition Method" and "IP Address" are updated to "BOOTP," and "Non-Set," respectively, and the inconsistency described above is eliminated.

TABLE 6

| Item | Setting Information | Group ID | Modification | Updatability | Update Occurrence | Determination |
|---|---|---|---|---|---|---|
| IP Address Acquisition Method | Fixed | 1 | 1 | 1 | 0 | ○ |
| IP Address | 192.168.10.11 | 1 | 1 | 0 | 0 | ○ |
| Authenticatability | Authenticate | 2 | 1 | 1 | 0 | ○ |

TABLE 6-continued

| Item | Setting Information | Group ID | Modification | Updatability | Update Occurrence | Determination |
|---|---|---|---|---|---|---|
| Authentication Method | Main Body | 2 | 1 | — | 0 | ○ |
| Authenticating Server Address | auth1.fx.co.jp | 2 | 1 | — | 0 | ○ |
| Mail Server Address | mail1.fx.co.jp | — | 1 | — | 0 | X |
| Box Password | boxpass1 | — | 1 | — | 0 | X |
| Destination List | list1 | — | 1 | 1 | 0 | ○ |
| Volume | Medium | — | 0 | 0 | 0 | X |
| Power-Saving Waiting Time | — | — | 0 | — | 0 | ○ |
| Administrator Password | mgpass1 | — | 1 | — | 0 | X |

Next, another updating example will be described. In the example of Table 6, in the present setting data 142, the modification information of all of the items excluding "Volume" and "Power-Saving Waiting Time" represents "1" (Modified). Moreover, the updatability information of "IP Address Acquisition Method," "Authenticatability," and "Destination List" is set to "1" (Update), and the updatability information of "IP Address" and "Volume" is set to "0" (Do Not Update). In Table 6, the "Determination" column represents the result of the determination by the update controller 103. A setting item marked with "○" is an updating target, and a setting item marked with "X" is not an updating target.

As described above, it is determined whether the setting information of an item to which the updatability information and a group ID are not set is an updating target or not based on only the modification information. Thus, "Power-Saving Waiting Time" is determined to be an updating target, and "Mail Server Address," "Box Password," and "Administrator Password" are determined not to be an updating target.

Moreover, as described above, when the group ID is not set to be an updating target, the setting information of an item to which a group ID is set is updated regardless of the contents of the modification information and the updatability information. Thus, "Destination List" of which the updatability information is "1" is determined to be an updating target, and "Volume" of which the updatability information is "0" is determined not to be an updating target. In this way, the user may determine whether or not to update setting information by setting updatability information to the setting information regardless of whether the setting information is individually modified or not.

Moreover, when any one of the setting information having the same group ID is determined to be an updating target, the setting information of an item to which a group ID is set is updated regardless of the contents of the modification information and the updatability information. Thus, although different update information of "1" (Update) and "0" (Do Not Update) are set to "IP Address Acquisition Method" and "IP Address" having the same group ID, both items are determined to be an updating target.

Moreover, as for "Authenticatability," "Authentication Method," and "Authenticating Server Address" having the same group ID, since the updatability information of "Authenticatability" is set to "1" (Update), all of the items are determined to be an updating target although the updatability information of the other two items is not set ("-"). In this example, although "Authentication Method" is "Main Body" whereas "Authenticating Server Address" is set, so that the contents of the two items are inconsistent, since all of the items are determined to be an updating target, the two items are collectively updated to correct settings contents.

TABLE 7

| Item | Setting Information | Group ID | Modification | Updatability | Update Occurrence |
|---|---|---|---|---|---|
| IP Address Acquisition Method | BOOTP | 1 | 1 | 1 | 1 |
| IP Address | — | 1 | 1 | 0 | 1 |
| Authenticatability | Authenticate | 2 | 1 | 1 | 1 |
| Authentication Method | Server | 2 | 1 | — | 1 |
| Authenticating Server Address | auth2.fx.co.jp | 2 | 1 | — | 1 |
| Mail Server Address | — | — | 1 | — | 0 |
| Box Password | — | — | 1 | — | 0 |
| Destination List | list2 | — | 1 | 1 | 1 |
| Volume | Medium | — | 0 | 0 | 0 |
| Power-Saving Waiting Time | 10 Minutes | — | 0 | — | 1 |
| Administrator Password | — | — | 1 | — | 0 |

Table 7 illustrates the contents of the present setting data 142 when the setting information illustrated in Table 6 are updated based on the reference setting information illustrated in Table 3. As understood from Table 7, "Authenticatability," "Authentication Method," and "Authenticating Server Address" are updated to "Authenticate," "Server," and "auth2.fx.co.jp," respectively, and the inconsistency described above is eliminated.

In this way, the update controller 103 determines whether each of the setting information is an updating target based on at least one of the corresponding group ID, the corresponding modification information, and the corresponding updatability information. The determination result may be transmitted to the image forming device 1a shown in FIG. 1 via the communication processing unit 17 before the reference setting data 144 is received (step St21 in FIG. 8). By doing so, the image forming device 1a transmits only the setting information of the updating target to the image forming device 1b based on the determination result, whereby the size of data communicated decreases.

In the example described above, although the setting information of the present setting data 142 is updated to the same content as the reference setting information of the reference setting data 144, the invention is not limited to this. For example, when the reference setting information of the reference setting data 144 and the setting information of the present setting data 142 represent a numerical value or a degree, the update controller 103 may update the setting information to an intermediate numerical value or an intermediate degree between the numerical value or degree of the reference setting information and the numerical value or degree of the setting information before updating.

In the example described above, "Volume" representing the degree of High, Medium, and Low and "Power-Saving Waiting Time" representing time are the targets of the updating method described above. For example, When "Volume" of the present setting data 142 is "High," and "Volume" of the reference setting data 144 is "Low," "Volume" of the present setting data 142 is updated to "Medium." Moreover, when "Power-Saving Waiting Time" of the present setting data 142 is 1 minute, and "Power-Saving Waiting Time" of the reference setting data 144 is 10 minutes, "Power-Saving Waiting Time" of the present setting data 142 is updated to 5 minutes. In this way, the present setting data 142 is updated so as to be an appropriate level with respect to the reference setting data 144.

Moreover, the backup controller 104 in FIG. 3 functions as a backup unit that copies and stores the present setting data 142 as backup setting data 143 for backup. The backup controller 104 performs a backup process in accordance with the operation of the user input via the operating unit 160. As described above, the backup setting data 143 may be stored for each date when backup processing is performed.

The recovery controller 105 functions as a recovery unit that recovers the setting information updated by the update controller 105 to the content before the updating in respective groups. The recovery controller 105 performs a recovery process in accordance with the operation of the user input via the operating unit 160. Before performing the recovery process, the user may designate the date of backup using the operating unit 160.

Figure 9:
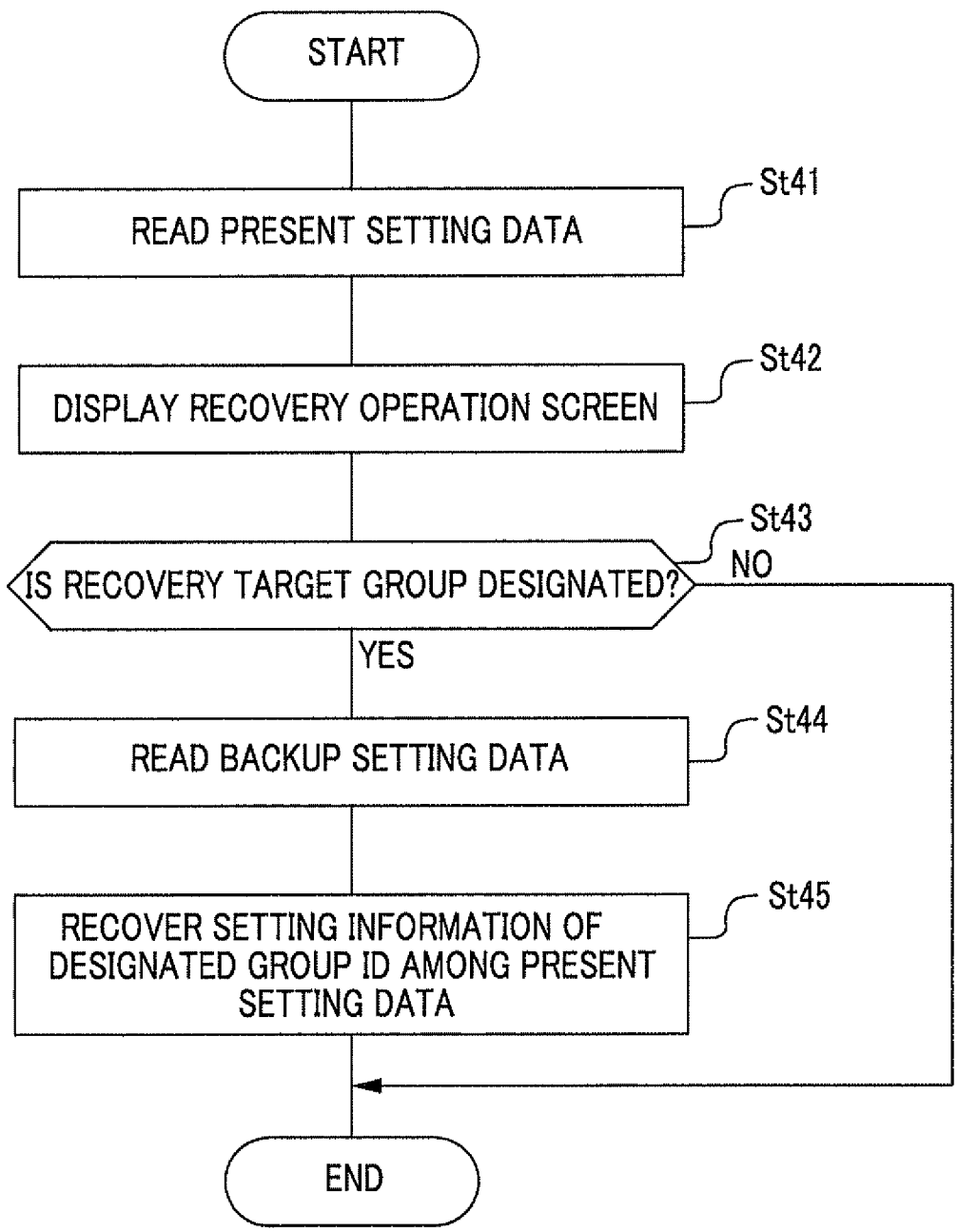
FIG. 9 is a flowchart showing the process of a recovery controller.

FIG. 9 shows the process of the recovery controller 105. The recovery controller 105 reads the present setting data 142 (step St41) and then displays a recovery operation screen on the display 161 (step St42).

Figure 10:
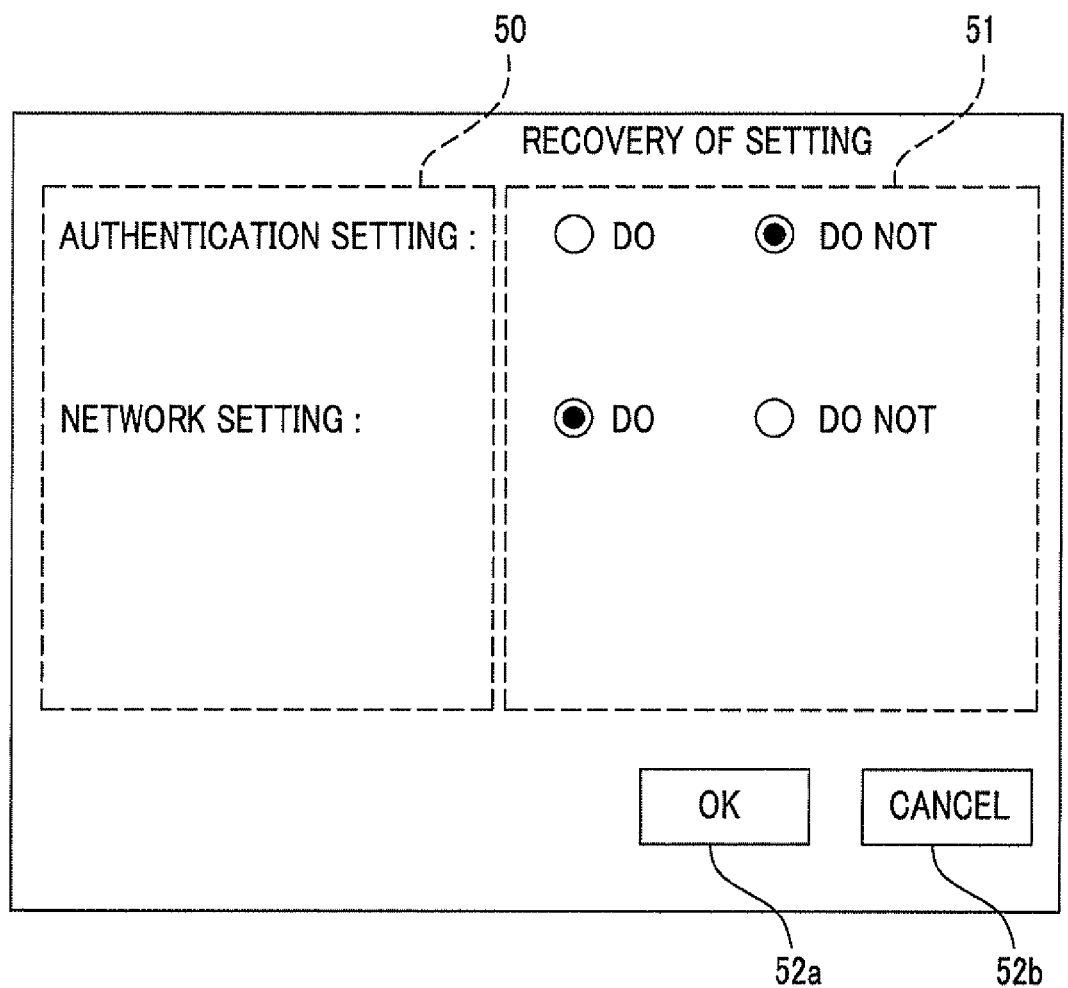
FIG. 10 shows an example of a display screen in which recovery of settings is performed.

FIG. 10 shows an example of the recovery operation screen. In the screen, a region 50 in which at least one group name is displayed, a region 51 in which a recovery target is selected for each group, an OK button 52a, and a Cancel button 52b are included. Here, "Authentication Setting" in the region 50 corresponds to the group ID "2" and "Network Setting" corresponds to the group ID "1."

The user designates whether each group is a recovery target using the touch panel which is the operating unit 160, for example. When the OK button 52a is pressed, the recovery target is finalized. When the Cancel button 52b is pressed, the selected contents edited in the screen are canceled.

Referring to FIG. 9, when the OK button 52a is pressed in the setting modification screen so that a recovery target group is designated (step St43: YES), the recovery controller 105 reads the backup setting data 143 (step St44) and recovers the content of the setting information of the designated group based on the backup setting data 143 (step St45). On the other hand, the recovery controller 105 ends processing when the Cancel button 52b is pressed (step St43: NO).

TABLE 8

| Item | Setting Information | Group ID | Modification | Updatability | Update Occurrence |
|---|---|---|---|---|---|
| IP Address Acquisition Method | Fixed | 1 | 1 | 1 | 1 |
| IP Address | 192.168.10.11 | 1 | 1 | 0 | 1 |

TABLE 8-continued

| Item | Setting Information | Group ID | Modification | Updatability | Update Occurrence |
|---|---|---|---|---|---|
| Authenticatability | Authenticate | 2 | 1 | 1 | 1 |
| Authentication Method | Server | 2 | 1 | — | 1 |
| Authenticating Server Address | auth2.fx.co.jp | 2 | 1 | — | 1 |
| Mail Server Address | — | — | 1 | — | 0 |
| Box Password | — | — | 1 | — | 0 |
| Destination List | list2 | — | 1 | 1 | 1 |
| Volume | Medium | — | 0 | 0 | 0 |
| Power-Saving Waiting Time | 10 Minutes | — | 0 | — | 1 |
| Administrator Password | — | — | 1 | — | 0 |

Table 8 shows an example when "Network Setting" (group ID "1") in the example of Table 7 is designated, and a recovery process is performed. As understood from Table 8, "IP Address Acquisition Method" and "IP Address" are recovered to "Fixed" and "192.168.10.11" in accordance with the contents before updating, that is, the contents of Table 6. In this case, it is assumed that the contents of Table 6 are backed up.

Moreover, the initialization controller 106 in FIG. 3 functions as an initialization unit that collectively modifies the setting information, the modification information, and the updatability information of the present setting data 142 to the contents of the initial setting data 141. The initialization controller 106 performs an initialization process in accordance with the operation of the user input via the operating unit 160. When the initialization process is performed, the present setting data 142 is initialized to the state shown in Table 2.

The operation controller 107 functions as a controller that performs various processes such as an authentication process based on the identification information of the user in accordance with the setting information of the present setting data 142.

FIG. 11 shows the process of the operation controller 107. When processing such as an authentication process occurs (step St51: YES), the operation controller 107 reads the setting information used for the processing and the corresponding update occurrence information among the present setting data 142 (step St52). When the update occurrence information represents "0" (Not Updated) (step St53: NO), the operation controller 107 executes the processing, and the process of this flow ends (step St60).

On the other hand, when the update occurrence information represents "1" (Updated) (step St53: YES), the operation controller 107 notifies the user of the updating of the setting information via the display 161 (step St54) and displays choices asking the user about the continuability of the processing on the display 161 (step St55).

FIG. 12 shows an example of a notification screen when an authentication process by an authenticating server occurs after the settings of "Authentication Method" and "Authenticating Server Address" are updated. In the screen, a region 60 in which a setting item used for an authentication process is displayed, a region 61 in which the content of the setting information is displayed, a "YES" button 62a, and a "NO" button 62b are included. Moreover, information marked with a star symbol represents updated setting information. A form of notifying the occurrence of updating is not limited to this, and it may be notified by changing the color of setting information, turning on/off the display of the setting information, or outputting an audible message.

Moreover, FIG. 13 shows an example when the setting information of "Box Password" is modified. This screen is displayed only when an administrator of the box has logged in.

As above, the operation controller 107 as well as the display 161 functions as a notifying unit that notifies the user of the occurrence of updating of the setting information when processing is performed based on the setting information updated by the update controller 103.

Referring to FIG. 11, when the "YES" button 62a is pressed in the notification screen (step St56: YES), the operation controller 107 executes processing (step St61) and modifies the update occurrence information to "0" (step St62), and the process of this flow ends.

On the other hand, when the "NO" button 62b is pressed (step St56: NO), the operation controller 107 halts the processing (step St57). As above, the operation controller 107 functions as a controller that continues or halts the processing based on the instruction from the user input via the operating unit 160. Thus, it is possible to prevent processing from being executed in accordance with the setting contents which are not intended by the user.

Moreover, the operation controller 107 reads the backup setting data 143 (step St58) and recovers the content of the setting information used for the processing based on the backup setting data 143 (step St59), and the process of this flow ends. As above, the operation controller 107 also functions as a recovery unit that recovers the setting information of the present setting data 142 to the content before the updating by the update controller 103 when processing is halted. The recovery process may be performed based on the initial setting data 141 instead of the backup setting data 143.

In the exemplary embodiment described above, although the individual modification process by the individual modification controller 100 is performed in accordance with the operation from the operating unit 160, the invention is not limited to this. For example, the individual modification process may be performed based on data received from an external device such as a personal computer connected to the LAN 8 via the communication processing unit 17. In this case, as described above, since the reference setting data 144 is also received via the LAN 8, the image forming device 2b may determine whether the received data is the reference setting data 144 or individual modification data for individual modification processing.

In order to perform the determination, for example, as shown in FIG. 14, data identification information representing a data type may be included in the reference setting data 144 and the individual modification data. The data identification information represents any one of "For Update" and "For Individual Modification" and is assigned to the header of the respective reference setting information (1) to (N) or the respective setting information (1) to (N). The data identification information is not limited to the shown form. For example, the data identification information may be assigned to the rearmost position of data and may be assigned to the individual reference setting information (1) to (N) or the individual setting information (1) to (N). As the data format, a simple object access protocol (SOAP) format may be employed, for example.

FIG. 15 is a flowchart of a determining process based on data identification information. Upon receiving data from an external device (step St61), the CPU 10 determines the type of data based on the data identification information (step St62). When the identification information represents "For Update" (step St62: YES), the update controller 103 performs the setting information updating process based on the received data (the reference setting data 144) (step St63). On the other hand, if not, that is, when the data identification information represents "For Individual Modification" (step St62: NO), the individual modification controller 100 performs an individual modification process on the setting information based on the received data (step St64). In this way, the CPU 10 performs a data determining process.

The data determining method is not limited to the data identification information. For example, when a device (the terminal device 2 shown in FIG. 1) that transmits the reference setting data 144 is different from a device that transmits individual modification data, the data type may be determined based on an IP address and a media access control (MAC) address included in the data. In this case, a manufacturer's number (identification number) of a device may be included in the data and may be used for the determining.

Moreover, when a user (for example, an administrator of an entire system including the image forming devices 1a and 1b in FIG. 1) that transmits the reference setting data 144 is different from a user (for example, an administrator of the image forming device 1b) that transmits individual modification data, user identification information for identifying the user that transmitted the data may be included in the data and may be used for the determining.

Furthermore, when the reference setting data 144 is transmitted to the multiple image forming devices 1b and the individual modification data is transmitted to the single image forming device 1b, the determining may be performed based on a data transmission form. That is, when data is transmitted by the form of multicast or broadcast, the data is determined to be the reference setting data 144. On the other hand, when data is transmitted by the form of unicast, the data is determined to be individual modification data. This determination is performed based on a destination address (DA) included in the data, for example. As the determining method, a method of determining based on the kind of an application used for the transmission process in the device that transmits data may be used in addition to the above-described method.

Moreover, in the above-described exemplary embodiment, although the presence-of-modification specifying unit 108 specifies setting information which is not modified by the individual modification controller 100 based on the modification information stored in association with the setting information in the HDD 14, the specifying method is not limited to this. For example, as described above, when the individual modification process by the individual modification controller 100 is instructed from the terminal device via the LAN 9, the terminal device may store the modification information in a storage unit such as an HDD installed in the own device. In this case, when performing the updating process, the update controller 103 may acquire and refer to the modification information from the terminal device via the communication processing unit 17 to thereby specify setting information which is not modified. As above, as a method of specifying the setting information which is not modified, various methods may be used. Specifying the setting information which is not modified is analogous to specifying the setting information which is modified.

As described above, according to the image forming device 1 of this modification example, part of the setting information excluding the setting information which is individually modified by the user are updated easily. Here, the user sets the updatability information for each setting information whereby an updating target or a non-updating target is determined regardless of whether the setting information is modified or not. Moreover, since setting information of the items belonging to the same group are collectively updated or recovered, inconsistency of the contents of the setting information in the group is prevented.

The same advantages as the exemplary embodiment described above are obtained when a recording medium in which a program for implementing the respective functions described above is recorded is provided to an image forming device, and a computer in the device executes the program. The recording medium may be any one of a CD-ROM, a DVD, and an SD card as long as it is readable by the computer.

The content of the present invention has been described in detail with reference to the exemplary embodiment. It is obvious that those skilled in the art may make various modifications based on the basic technical spirit and teaching of the present invention.

The foregoing description of the exemplary embodiments of the present invention has been provided for the purposes of illustration and description. It is not intended to be exhaustive or to limit the present invention to the precise forms disclosed. Obviously, many modifications and variations will be apparent to practitioners skilled in the art. The exemplary embodiments were chosen and described in order to best explain the principles of the present invention and its practical applications, thereby enabling others skilled in the art to understand the present invention for various exemplary embodiments and with the various modifications as are suited to the particular use contemplated. It is intended that the scope of the present invention be defined by the following claims and their equivalents.

What is claimed is:

1. An image forming device comprising:
a modifying unit that individually modifies a plurality of items of setting information that are stored in the image forming device prior to modification;
a specifying unit that specifies an item of the setting information which is not modified by the modifying unit;
a communication unit that communicates with an external device;
an acquiring unit that acquires reference setting information corresponding to each of the plurality of items of the setting information from the external device via the communication unit;
an updating unit that updates the item of the setting information specified by the specifying unit based on the reference setting information acquired by the acquiring unit; and
an assigning unit that assigns updatability information indicating updatability of an item of the setting information to an item of the setting information selected in accordance with an user's operation,
wherein the updating unit updates the item of the setting information to which the updatability information is assigned by the assigning unit when the setting information is determined to be updatable based on the updatability information and does not update the setting information when the setting information is determined not to be updatable, and
wherein the updating unit identifies a group to which an item of the setting information belongs in accordance with group information and updates all of the items of the setting information included in the group when at least one item of the setting information included in the group is specified by the specifying unit as one which is not modified by the modifying unit, or when at least one item of the setting information included in the group is determined to be updatable based on the updatability information.

2. The image forming device according to claim 1, further comprising:
a first recovery unit that recovers the setting information updated by the updating unit to a content before updating in respective groups.

3. The image forming device according to claim 2, wherein when the reference setting information and the setting information indicate a numerical value or a degree, the updating unit updates the setting information to an intermediate numerical value or degree between the numerical value or degree of the reference setting information and the numerical value or degree of the setting information before updating.

4. The image forming device according to claim 1, wherein when the reference setting information and the setting information indicate a numerical value or a degree, the updating unit updates the setting information to an intermediate numerical value or degree between the numerical value or degree of the reference setting information and the numerical value or degree of the setting information before updating.

5. The image forming device according to claim 1, wherein when the reference setting information and the setting information indicate a numerical value or a degree, the updating unit updates the setting information to an intermediate numerical value or degree between the numerical value or degree of the reference setting information and the numerical value or degree of the setting information before updating.

6. The image forming device according to claim 1, wherein when the reference setting information and the setting information indicate a numerical value or a degree, the updating unit updates the setting information to an intermediate numerical value or degree between the numerical value or degree of the reference setting information and the numerical value or degree of the setting information before updating.

7. The image forming device according to claim 1, further comprising:
a notifying unit that notifies a user that updating of the setting information has occurred when processing is performed based on the setting information updated by the updating unit.

8. The image forming device according to claim 7, further comprising:
a controller that controls to continue or halt the processing based on an instruction from the user when the user is notified by the notifying unit.

9. The image forming device according to claim 8, further comprising:
a second recovery unit that recovers the setting information to a content before the updating by the updating unit when the processing is halted by the controller.

10. A non-transitory computer readable medium storing a program for causing an image forming device to function as:
a modifying unit that individually modifies a plurality of items of setting information that are stored in the image forming device prior to modification;
a specifying unit that specifies an item of the setting information which is not modified by the modifying unit;
a first controller that updates modification information of the item of the setting information which is modified by the modifying unit to a state indicating the presence of modification;

a communication unit that communicates with an external device;

an acquiring unit that acquires reference setting information corresponding to each of the plurality of items of the setting information from the external device via the communication unit; and an updating unit that updates the item of the setting information specified by the specifying unit based on the reference setting information acquired by the acquiring unit, wherein the image forming device also functions as an assigning unit that assigns updatability information indicating the updatability of an item of the setting information to an item of the setting information selected in accordance with an user's operation, and wherein the updating unit updates the item of the setting information to which the updatability information is assigned by the assigning unit when the setting information is determined to be updatable based on the updatability information and does not update the setting information when the setting information is determined not to be updatable, wherein the updating unit identifies a group to which an item of the setting information belongs in accordance with group information and updates all of the items of the setting information included in the group when at least one item of the setting information included in the group is specified by the specifying unit as one which is not modified by the modifying unit, or when at least one item of the setting information included in the group is determined to be updatable based on the updatability information.

11. The non-transitory computer readable medium according to claim 10, wherein the image forming device also functions as a first recovery unit that recovers the setting information updated by the updating unit to a content before updating in respective groups.

12. The non-transitory computer readable medium according to claim 10, wherein when the reference setting information and the setting information indicate a numerical value or a degree, the updating unit updates the setting information to an intermediate numerical value or degree between the numerical value or degree of the reference setting information and the numerical value or degree of the setting information before updating.

13. The non-transitory computer readable medium according to claim 10, wherein the image forming device also functions as a notifying unit that notifies the user of the occurrence of updating of the setting information when processing is performed based on the setting information updated by the updating unit.

14. The non-transitory computer readable medium according to claim 13, wherein the image forming device also functions as a controller that controls to continue or halt the processing based on an instruction from the user when the user is notified by the notifying unit.

15. The non-transitory computer readable medium according to claim 14, wherein the image forming device also functions as a second recovery unit that recovers the setting information to the content before the updating by the updating unit when the processing is halted by the controller.

16. An image forming method comprising: individually modifying a plurality of items of setting information that are stored in an image forming device prior to the modifying; specifying an item of the setting information which is not modified; communicating with an external device; acquiring reference setting information corresponding to each of the plurality of items of the setting information from the external device; updating the specified item of the setting information based on the acquired reference setting information; assigning updatability information indicating updatability of an item of the setting information to an item of the setting information selected in accordance with an user's operation; wherein the item of the setting information, in which the updatability information is assigned, is updated when the setting information is determined to be updatable based on the updatability information and the item of the setting information, in which the updatability information is assigned, is not updated when the setting information is determined not to be updatable, and wherein the method further comprises identifying a group to which an item of the setting information belongs in accordance with group information and wherein all of the items of the setting information included in the group are updated when at least one item of the setting information included in the group is specified by the specifying unit as one which is not modified, or when at least one item of the setting information included in the group is determined to be updatable based on the updatability information.

* * * * *